United States Patent
Ou

(10) Patent No.: US 11,435,872 B2
(45) Date of Patent: Sep. 6, 2022

(54) ICON CONTROL METHOD AND TERMINAL DEVICE

(71) Applicant: VIVO MOBILE COMMUNICATION CO., LTD., Dongguan (CN)

(72) Inventor: Fujun Ou, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 0 days.

(21) Appl. No.: 17/472,693

(22) Filed: Sep. 13, 2021

(65) Prior Publication Data

US 2021/0405853 A1 Dec. 30, 2021

Related U.S. Application Data

(63) Continuation of application No. PCT/CN2020/074728, filed on Feb. 11, 2020.

(30) Foreign Application Priority Data

Mar. 14, 2019 (CN) .......................... 201910194730.2

(51) Int. Cl.
*G06F 3/04817* (2022.01)
*G06F 3/0482* (2013.01)
*G06F 3/0488* (2022.01)

(52) U.S. Cl.
CPC ........ *G06F 3/04817* (2013.01); *G06F 3/0482* (2013.01); *G06F 3/0488* (2013.01)

(58) Field of Classification Search
CPC .. G06F 3/04817; G06F 3/0482; G06F 3/0488; G06F 3/0486
See application file for complete search history.

(56) References Cited

U.S. PATENT DOCUMENTS

| 8,266,550 B1 | 9/2012 | Chakirov et al. |
| 2013/0055142 A1* | 2/2013 | Li .......................... G06F 3/0488 715/777 |

(Continued)

FOREIGN PATENT DOCUMENTS

| CN | 102306080 A | 1/2012 |
| CN | 102789365 A | 11/2012 |

(Continued)

OTHER PUBLICATIONS

International Search Report issued in corresponding International Application No. PCT/CN2020/074728, dated May 11, 2020, 4 pages.

(Continued)

*Primary Examiner* — Mong-Shune Chung
(74) *Attorney, Agent, or Firm* — IPX PLLC

(57) ABSTRACT

The embodiments of the present disclosure provide an icon control method and a terminal device. The method includes: receiving a first input that is performed by a user, where the first input is used to trigger a terminal device to enter an icon editing state, a target object is displayed on N pages on a desktop of the terminal device, the target object includes at least one of the following: an application icon or an application folder, where one application folder includes at least two application icons, and one application icon is used to indicate one application; and displaying at least one type of editing control on the desktop in response to the first input, where each type of editing control of the at least one type of editing control is used to edit the target object on the N pages; where in a case that the terminal device is in the icon editing state, the at least one type of editing control is always displayed on the desktop.

18 Claims, 13 Drawing Sheets

(56) References Cited

U.S. PATENT DOCUMENTS

| | | | | |
|---|---|---|---|---|
| 2013/0125043 | A1* | 5/2013 | Jeon | G06F 3/0488 |
| | | | | 345/173 |
| 2014/0165006 | A1* | 6/2014 | Chaudhri | H04N 7/15 |
| | | | | 715/835 |
| 2017/0277380 | A1* | 9/2017 | Shan | G06F 3/04817 |
| 2017/0336944 | A1* | 11/2017 | Liu | G06F 3/04883 |
| 2017/0371535 | A1* | 12/2017 | Li | G06F 3/04845 |

FOREIGN PATENT DOCUMENTS

| | | | |
|---|---|---|---|
| CN | 102999249 | A | 3/2013 |
| CN | 103226473 | A | 7/2013 |
| CN | 103324404 | A | 9/2013 |
| CN | 103616980 | A | 3/2014 |
| CN | 104808911 | A | 7/2015 |
| CN | 104866179 | A | 8/2015 |
| CN | 105205108 | A | 12/2015 |
| CN | 105487749 | A | 4/2016 |
| CN | 105739826 | A | 7/2016 |
| CN | 106873842 | A | 6/2017 |
| CN | 107562323 | A | 1/2018 |
| CN | 107861784 | A | 3/2018 |
| CN | 110069179 | A | 7/2019 |

OTHER PUBLICATIONS

Search report issued in related Chinese application No. 201910194730. 2, dated Jun. 1, 2020, 7 pages.
First Office Action issued in related Chinese application No. 201910194730.2, dated Aug. 3, 2020, 12 pages.

* cited by examiner

ICON CONTROL METHOD AND TERMINAL DEVICE

This application is a bypass continuation of PCT Application No. PCT/CN2020/074728 filed Feb. 11, 2020, which claims priority to Chinese Patent Application No. 201910194730.2, filed with the China National Intellectual Property Administration on Mar. 14, 2019, both of which are incorporated herein by reference in their entireties.

TECHNICAL FIELD

Embodiments of the present disclosure relate to the field of terminal technologies, and in particular, to an icon control method and a terminal device.

BACKGROUND

With continuous development of terminal technologies, terminal devices have more and more applications, and there are more and more application icons on desktops of terminal devices.

At present, a user usually manages a large number of application icons by triggering a terminal device to manage an application folder. In a scenario where a user manages an application folder, when the user needs to move an application icon (hereinafter referred to as an application icon A) to an application folder (hereinafter referred to as an application folder B), if the application icon A and the application folder B are not on a same page, the user needs to first trigger the terminal device to move the application icon A and the application folder B to a same page, and then trigger the terminal device to move the application icon A to the application folder B.

However, in the above process of moving the application icon A and the application folder B to the same page, because the user needs to operate across pages and a cross-page operation is usually not easy to control and error-prone, the user may need to perform multiple operations to move the application icon A and the application folder B to the same page. As a result, an operation process of moving the application icon to the application folder is time-consuming. Therefore, the efficiency of managing an application folder in related technologies is low.

SUMMARY

Embodiments of the present disclosure provide an icon control method and a terminal device, to resolve a problem of low efficiency of managing an application folder in related technologies.

To resolve the foregoing technical problem, the present disclosure is implemented as follows:

According to a first aspect, the embodiments of the present disclosure provide an icon control method. The method includes: receiving a first input that is performed by a user, where the first input is used to trigger a terminal device to enter an icon editing state, a target object is displayed on N pages on a desktop of the terminal device, the target object includes at least one of the following: an application icon and an application folder, one application folder includes at least two application icons, and one application icon is used to indicate one application; and displaying at least one type of editing control on the desktop in response to the first input, where each type of editing control of the at least one type of editing control is used to edit the target object on the N pages; where in a case that the terminal device is in the icon editing state, the at least one type of editing control is always displayed on the desktop, and N is a positive integer.

According to a second aspect, the embodiments of the present disclosure provide a terminal device. The terminal device includes: a receiving module and a display module. The receiving module is configured to receive a first input that is performed by a user, where the first input is used to trigger a terminal device to enter an icon editing state, a target object is displayed on N pages on a desktop of the terminal device, the target object includes at least one of the following: an application icon and an application folder, one application folder includes at least two application icons, and one application icon is used to indicate one application. The display module is configured to display at least one type of editing control on the desktop in response to the first input received by the receiving module, where each type of editing control of the at least one type of editing control is used to edit the target object on the N pages; and where in a case that the terminal device is in the icon editing state, the at least one type of editing control is always displayed on the desktop, and N is a positive integer.

According to a third aspect, the embodiments of the present disclosure provide a terminal device, including: a processor, a memory, and a computer program stored in the memory and executable on the processor, where the computer program, when executed by the processor, implements the steps of the icon control method according to the foregoing first aspect.

According to a fourth aspect, the embodiments of the present disclosure provide a computer-readable storage medium, where a computer program is stored in the computer-readable storage medium, and the computer program, when executed by a processor, implements the steps of the icon control method according to the foregoing first aspect.

In the embodiments of the present disclosure, a terminal device may receive a first input that is performed by a user, where the first input is used to trigger a terminal device to enter an icon editing state, a target object is displayed on N pages on a desktop of the terminal device, the target object includes at least one of the following: an application icon and an application folder, one application folder includes at least two application icons, and one application icon is used to indicate one application; and display at least one type of editing control on the desktop in response to the first input, where each type of editing control of the at least one type of editing control is used to edit the target object on the N pages; where in a case that the terminal device is in the icon editing state, the at least one type of editing control is always displayed on the desktop, and N is a positive integer. In this solution, in the icon editing state, the terminal device can edit the target object on the N pages by always displaying each type of editing control of the at least one type of editing control on the desktop, so that the user does not need to drag an icon across pages to manage the icon. Therefore, this can improve the efficiency of managing the application folder, and can resolve the problem of low efficiency of managing the application folder in related technologies.

DETAILED DESCRIPTION

Figure 1:
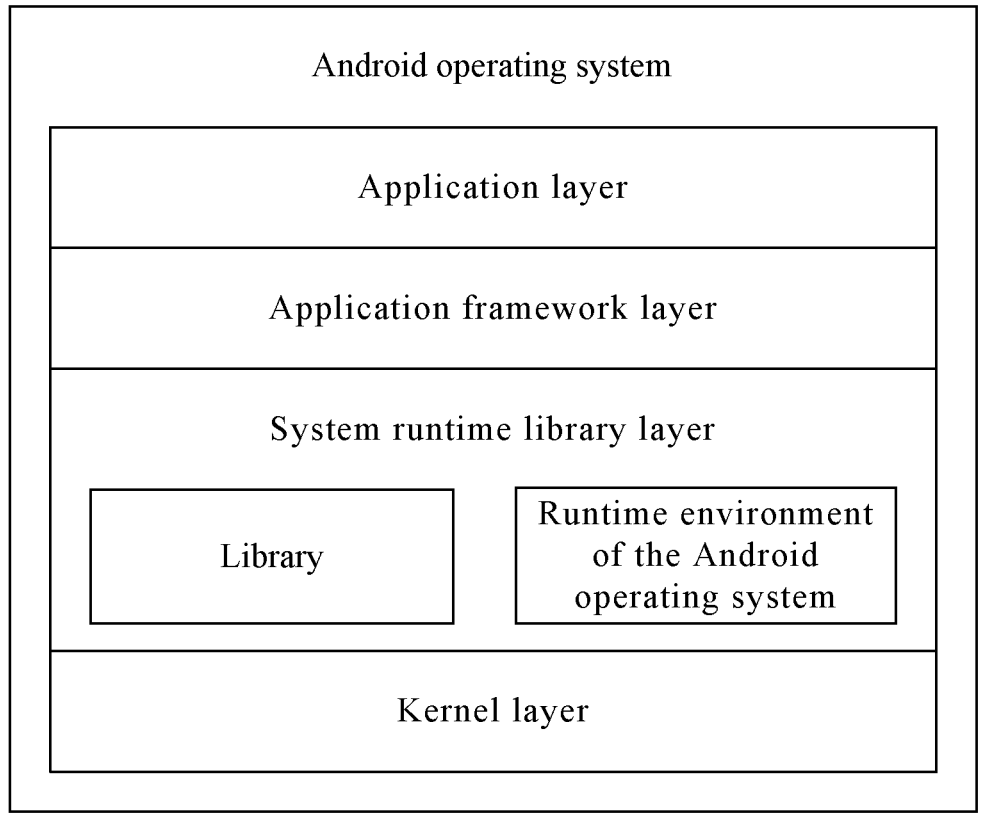
FIG. 1 is a schematic architectural diagram of a possible Android operating system according to an embodiment of the present disclosure.

The following clearly and completely describes the technical solutions in the embodiments of the present disclosure with reference to the accompanying drawings in the embodiments of the present disclosure. Apparently, the described embodiments are some rather than all of the embodiments of the present disclosure. Based on the embodiments of the present disclosure, all other embodiments obtained by a person of ordinary skills in the art without creative efforts fall within the protection scope of the present disclosure.

The term "and/or" in this specification describes an association relationship of associated objects, indicating that three relationships may exist. For example, A and/or B may indicate three cases: Only A exists, both A and B exist, and only B exists. A character "/" in this specification indicates an "or" relationship between associated objects. For example, A/B indicates A or B.

In the specification and claims of the present disclosure, the terms such as "first", "second", "third", and "fourth" are used to distinguish between different objects, but are not used to describe a particular order of the objects. For example, a first input, a second input, a third input, and a fourth input are used to distinguish between different inputs, and are not used to describe a particular order of the inputs.

In the embodiments of the present disclosure, the term such as "exemplary" or "for example" is used to represent giving an example, an illustration, or a description. Any embodiment or design scheme described as "exemplary" or "for example" in the embodiments of the present disclosure should not be construed as being more preferred or advantageous than other embodiments or design schemes. Specifically, the words such as "exemplary" or "for example" are used to present related concepts in a specific manner.

In the description of the embodiments of the present disclosure, unless otherwise specified, the meaning of "a plurality of" means two or more. For example, a plurality of processing units mean two or more processing units, and a plurality of elements mean two or more elements.

In an icon control method provided in the embodiments of the present disclosure, a terminal device may receive a first input that is performed by a user, where the first input is used to trigger a terminal device to enter an icon editing state, a target object is displayed on N pages on a desktop of the terminal device, the target object includes at least one of the following: an application icon and an application folder, one application folder includes at least two application icons, and one application icon is used to indicate one application; and display at least one type of editing control on the desktop in response to the first input, where each type of editing control of the at least one type of editing control is used to edit the target object on the N pages; where in a case that the terminal device is in the icon editing state, the at least one type of editing control is always displayed on the desktop, and N is a positive integer. In this solution, in the icon editing state, the terminal device can edit the target object on the N pages by maintaining display of each type of editing control of the at least one type of editing control on the desktop, so that the user does not need to drag an icon across pages to manage the icon. Therefore, this can improve the efficiency of managing the application folder, and can resolve the problem of low efficiency of managing the application folder in related technologies.

The following uses the Android operating system as an example to introduce a software environment applicable to the icon control method provided by the embodiments of the present disclosure.

FIG. 1 is a schematic architectural diagram of a possible Android operating system according to an embodiment of the present disclosure. In FIG. 1, the architecture of the Android operating system includes 4 layers, namely: an application layer, an application framework layer, a system runtime library layer, and a kernel layer (specifically, it may be the Linux kernel layer).

The application layer includes various applications in the Android operating system (including system applications and third-party applications).

The application framework layer is the framework of applications. Developers can develop some applications based on the application framework layer while complying with the development principle of the application framework.

The system runtime library layer includes a library (also referred to as a system library) and a running environment of the Android operating system. The library mainly provides various resources required for the Android operating system. The running environment of the Android operating system is used for providing a software environment for the Android operating system.

The kernel layer is an operating system layer of the Android operating system, and is a lowest layer of software levels of the Android operating system. The kernel layer provides core system services and hardware-related drivers for the Android operating system based on the Linux kernel.

The Android operating system is used as an example. In the embodiments of the present disclosure, based on the system architecture of the Android operating system as shown in FIG. 1, developers can develop software programs that implement the icon control method provided by the embodiments of the present disclosure, so that the icon control method can be performed based on the Android operating system as shown in FIG. 1. That is, by running the software program in the Android operating system, the processor or the terminal can implement the icon control method provided by the embodiments of the present disclosure.

The terminal device in the embodiments of the present disclosure may be a mobile terminal device or a non-mobile terminal device. The mobile terminal device may be a mobile phone, a tablet computer, a notebook computer, a palmtop computer, a vehicle-mounted terminal, a wearable device, an ultra-mobile personal computer (UMPC), a netbook, a personal digital assistant (PDA), or the like. The non-mobile terminal device may be a personal computer (PC), a television (TV), a teller machine, a self-service machine, or the like. This is not specifically limited in the embodiment of the present disclosure.

The icon control method provided by the embodiments of the present disclosure may be performed by the terminal device (including a mobile terminal device and a non-mobile the terminal device), or may be performed by functional modules and/or functional entities in the terminal device that can implement the method. This may be specifically determined according to actual usage requirements, and is not limited in the embodiments of the present disclosure. In the following, the terminal device is used as an example, to illustrate the icon control method provided by the embodiments of the present disclosure.

Figure 2:
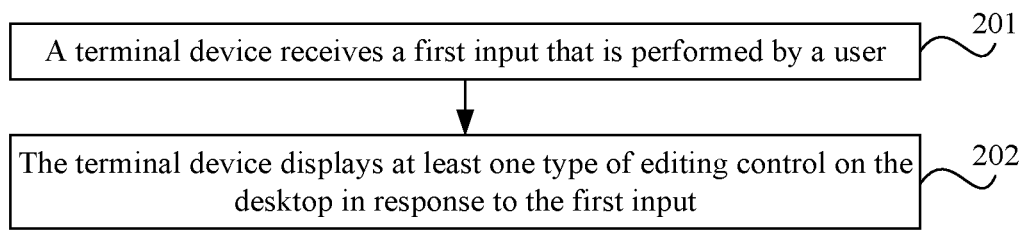
FIG. 2 is a first flowchart of an icon control method according to an embodiment of the present disclosure.

As shown in FIG. 2, the embodiments of the present disclosure provide an icon control method, and the method may include the following steps 201 and 202.

Step 201: The terminal device receives a first input performed by a user.

The first input is used to trigger a terminal device to enter an icon editing state, a target object is displayed on N pages on a desktop of the terminal device, the target object includes at least one of the following: an application icon and an application folder, one application folder includes at least two application icons, and one application icon is used to indicate one application, and N is a positive integer.

In the embodiments of the present disclosure, the target object may be an application icon, an application folder, or an application icon and an application folder.

The first input may be a long-press input performed by the user on any icon on any page on the desktop, or a two-finger input performed by the user on any page, a gesture input of the user above the terminal device, or other feasible inputs. This is not limited in the embodiments of the present disclosure.

In the embodiments of the present disclosure, the desktop includes at least N pages. That the target object is displayed on the N pages includes: at least two application icons are displayed on the N pages, or at least one application folder is displayed on the N pages (each application folder includes at least two application icons). In conclusion, at least two applications are installed in the terminal device, that is, the desktop includes at least two application icons (including the application icon in the application folder).

Step 202: The terminal device displays at least one type of editing control on the desktop in response to the first input.

Each type of editing control of the at least one type of editing control is used to edit the target object on the N pages; where in a case that the terminal device is in the icon editing state, the at least one type of editing control is always displayed on the desktop.

Each type of editing control may edit at least one of the following: an application icon and an application folder.

Optionally, each type of editing control may be displayed in a first area on the desktop. The first area is a part of the desktop and is an independent area, and does not belong to any page. When the terminal device is in the icon editing state, the at least one type of editing control does not change as the page changes, and is always displayed on the desktop (that is, no matter which page is currently displayed on the desktop, the current desktop always displays the at least one type of editing control).

Optionally, each type of editing control is displayed in a floating manner (in a form of a floating control) on the desktop, that is, each type of editing control does not belong to the desktop (does not belong to any page). When the page displayed on the desktop changes, the at least one type of editing control is always displayed on the desktop in a floating manner.

Each type of editing control may also be displayed in other manners, and this is not limited in the embodiments of the present disclosure.

The at least one type of editing control may be located anywhere on the desktop, for example, may be located on the upper edge, lower edge, left edge, or right edge of the desktop. This is not limited in the embodiments of the present disclosure.

Figure 3:
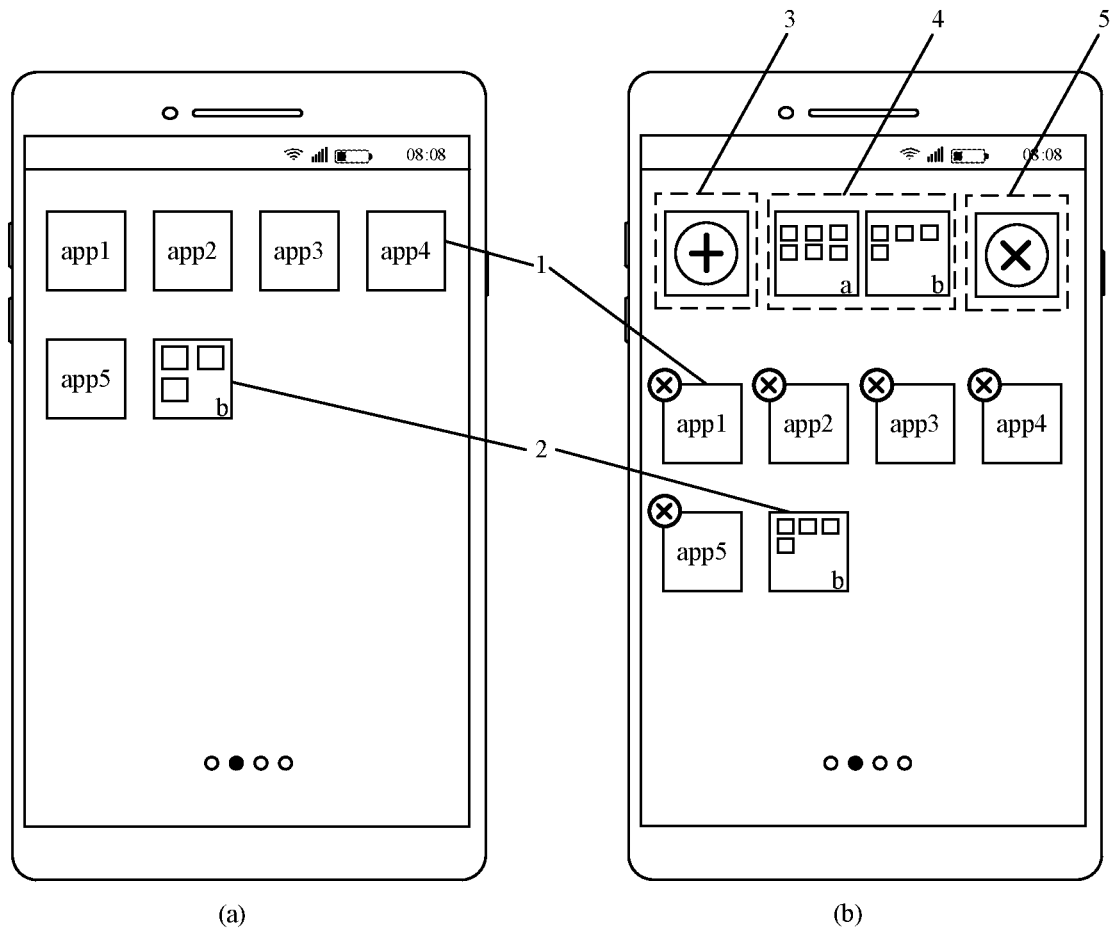
FIG. 3 is a first schematic diagram of an interface of an icon control method according to an embodiment of the present disclosure.

For example, as shown in (a) of FIG. 3, the first page of the desktop includes 5 application icons and 1 application folder, where a mark "1" indicates an application icon, and a mark "2" indicates an application folder. The terminal device receives a long-press input performed by the user on "app2", and the terminal device enters the icon editing state. As shown in (b) of FIG. 3, the terminal device displays three types of editing controls on the upper edge (top) of the desktop, where the mark "3" indicates a second type of editing control, a mark "4" indicates a first type of editing control, and a mark "5" indicates a third type of editing control.

It should be noted that in addition to the three types of editing controls in the embodiments of the present disclosure, there may also be other types of editing controls. This is not limited in the embodiments of the present disclosure. In the embodiments of the present disclosure, an arrangement order of the at least one type of editing control is not limited.

It should be noted that in the embodiments of the present disclosure, after the terminal device enters the icon editing state, the terminal device may display the at least one type of editing control. That is, the terminal device may display all types of editing controls, or displays some types of editing controls of all types of editing controls (at this time, the terminal device may be triggered by a user input to switch from some types of editing controls to other types of editing controls, or switch from some types of editing controls to all types of editing controls, and this is not limited in the embodiments of the present disclosure). This is specifically determined according to actual use requirements, and is not limited in the embodiments of the present disclosure. For example, there are three types of editing controls. Therefore, as shown in (b) of FIG. 3, the three types (all types) of editing controls may be displayed on the upper edge (top) of the desktop. Alternatively, one type of editing control of the three types of editing controls may be displayed. In this way, the terminal device is triggered by a user input to switch from one type of editing control to another type of editing control (switch to a different type of editing control), or switch the one type of editing control to at least two types of editing controls (that is, switch from one type of editing control to multiple types of editing controls). Alternatively, two types of editing controls of the three types of editing controls may be displayed.

Figure 4:
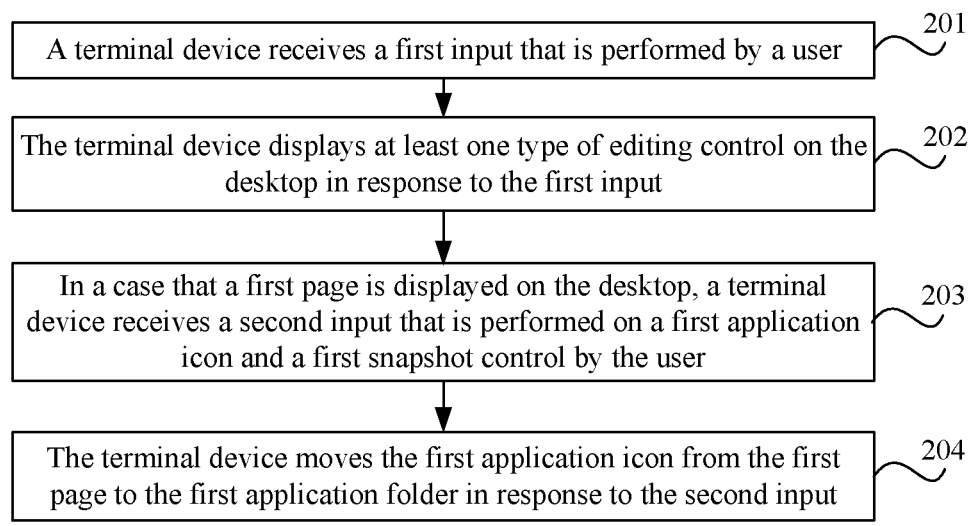
FIG. 4 is a second flowchart of an icon control method according to an embodiment of the present disclosure.

Optionally, the at least one type of editing control includes a first type of editing control, the first type of editing control includes at least one snapshot control, and each snapshot control of the at least one snapshot control is used to indicate different application folders. With reference to FIG. 2, as shown in FIG. 4, after step 202, the icon control method provided by the embodiments of the present disclosure may further include the following steps 203 and 204.

Step 203: In a case that a first page is displayed on the desktop, a terminal device receives a second input performed by the user on a first application icon and a first snapshot control.

The first application icon is an application icon on the first page, the first snapshot control is used to indicate a first application folder, and the first snapshot control is a snapshot control of the at least one snapshot control.

A snapshot control corresponds to an application folder on the desktop, and different snapshot controls correspond to different application folders. All snapshot controls (that is, all snapshot controls corresponding to all application folders on the desktop) may be displayed on the desktop at the same time. Alternatively, some snapshot controls (that is, at least one of all snapshot controls corresponding to all application folders on the desktop) may be displayed on the desktop at the same time. In this case, the user may further perform an input (for example, a slide input) to trigger the terminal device to switch snapshot controls displayed on the desktop (that is, change snapshot controls).

The display order of the at least one snapshot control on the desktop may be related to the display order of pages and the display order of application folders on each page (for example, the at least one snapshot control is arranged in the order of all pages and the order of folders on each page), or may not be related to the display order of pages and the display order of application folders on each page (for example, randomly arranged). This is specifically determined according to actual use requirements, and is not limited in the embodiments of the present disclosure.

The second input may be an input that the user drags the first application icon to the first snapshot control; or may be a first sub-input that the user selects the first application icon and a second sub-input that the user selects the first snapshot control (for example, the first sub-input and the second sub-input are both click inputs), or the second input may be other feasible inputs. This is not limited in the embodiments of the present disclosure.

The first application folder may be displayed on the first page, and the first application folder can also be displayed on pages other than the first page. This is not limited in the embodiments of the present disclosure.

Step 204: The terminal device moves the first application icon from the first page to the first application folder in response to the second input.

Figure 5:
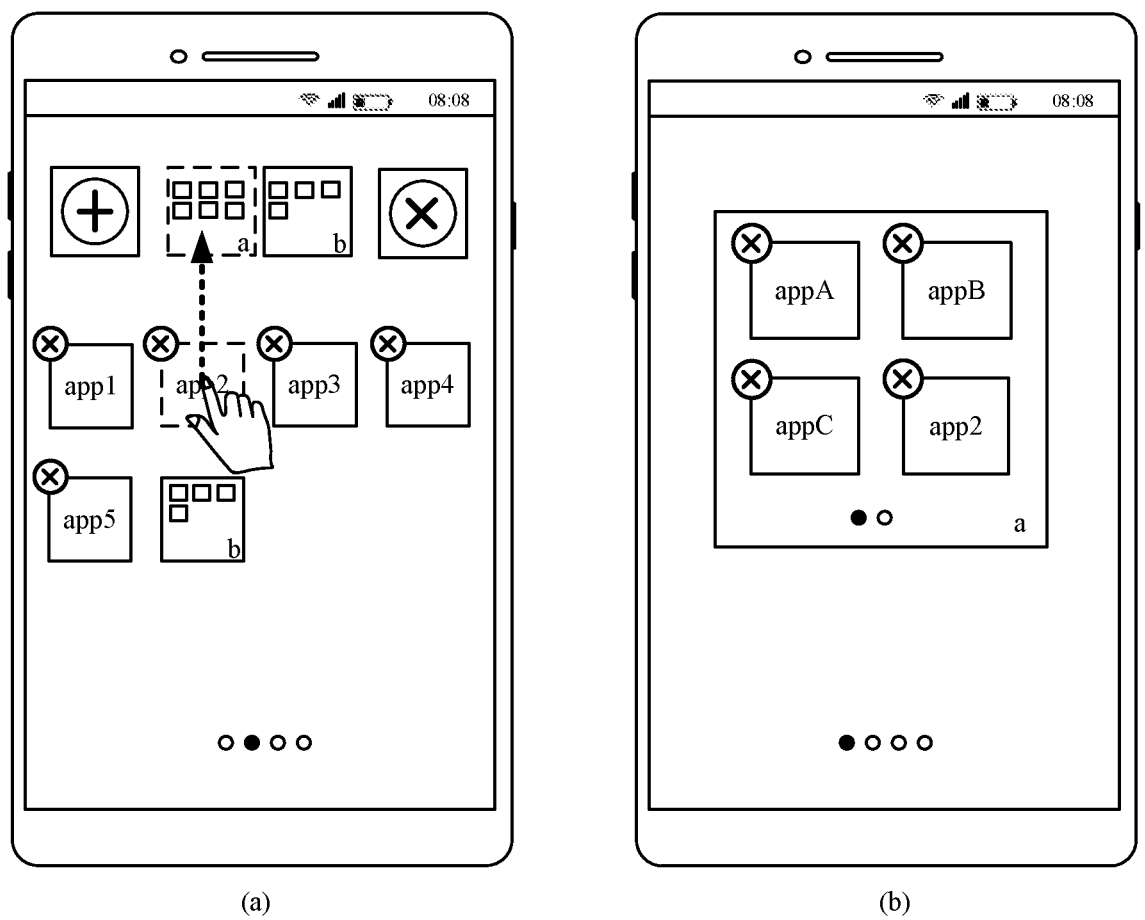
FIG. 5 is a second schematic diagram of an interface of an icon control method according to an embodiment of the present disclosure.

For example, as shown in (a) of FIG. 5, the first application icon is "app2", the first snapshot control is a snapshot control "a", the first application folder is the application folder "a", "app2" is displayed on the first page, and the application folder "a" is not displayed on the first page. The page displaying the application folder "a" may further include other icons, which are not shown in the figure. The second input is an input that the user drags "app2" to the snapshot control "a". Through the second input, the terminal device moves "app2" to the application folder "a", as shown in (b) of FIG. 5, and "app2" is displayed in the application folder "a".

In this way, the user can trigger the terminal device to move the first application icon from the first page to the first application folder by performing the second input on the first application icon and the first snapshot control. Especially, when the first application icon and the first application folder are on different pages, a cross-page operation can be avoided and the efficiency of managing the application folder can be improved.

Figure 6:
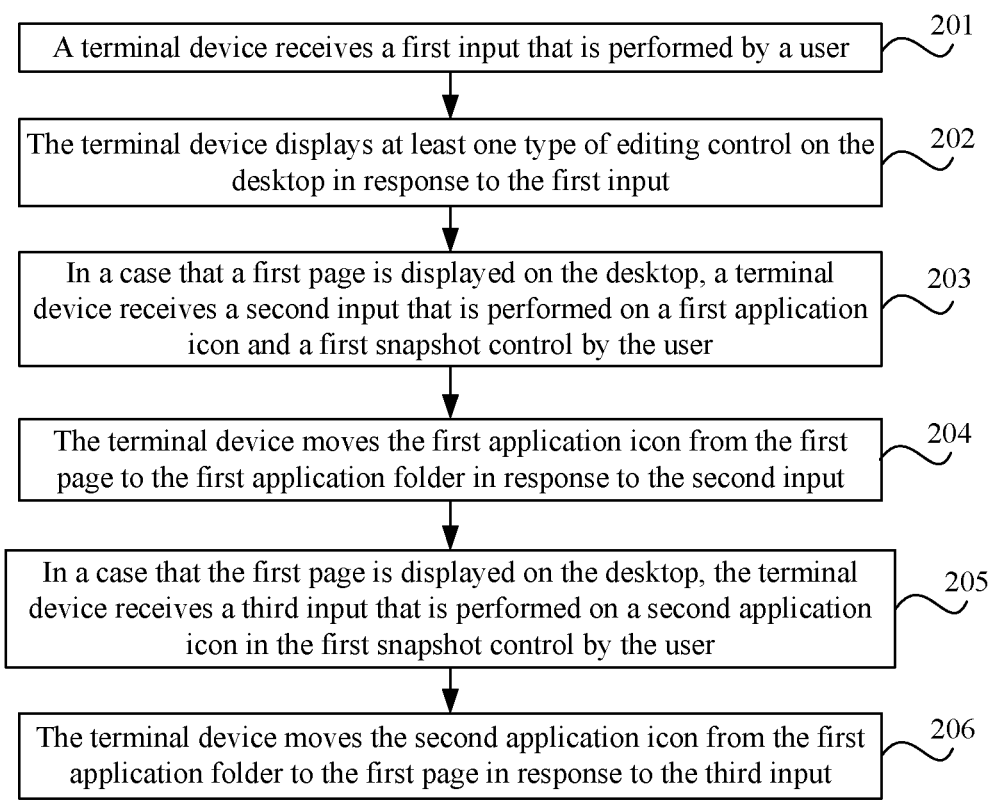
FIG. 6 is a third flowchart of an icon control method according to an embodiment of the present disclosure.

Optionally, with reference to FIG. 4, as shown in FIG. 6, after step 204, the icon control method provided in the embodiments of the present disclosure may further include the following steps 205 and 206.

Step 205: In a case that the first page is displayed on the desktop, the terminal device receives a third input performed by the user on a second application icon in the first snapshot control.

The third input may be an input that the user drags the second application icon from the first snapshot control to the first page; or may be an input that the user double-clicks the second application icon in the first snapshot control, or may be other feasible inputs. This is not limited in the embodiments of the present disclosure.

The second application icon and the first application icon may be the same or different. This is not limited in the embodiments of the present disclosure.

Step 206: The terminal device moves the second application icon from the first application folder to the first page in response to the third input.

Figure 7:
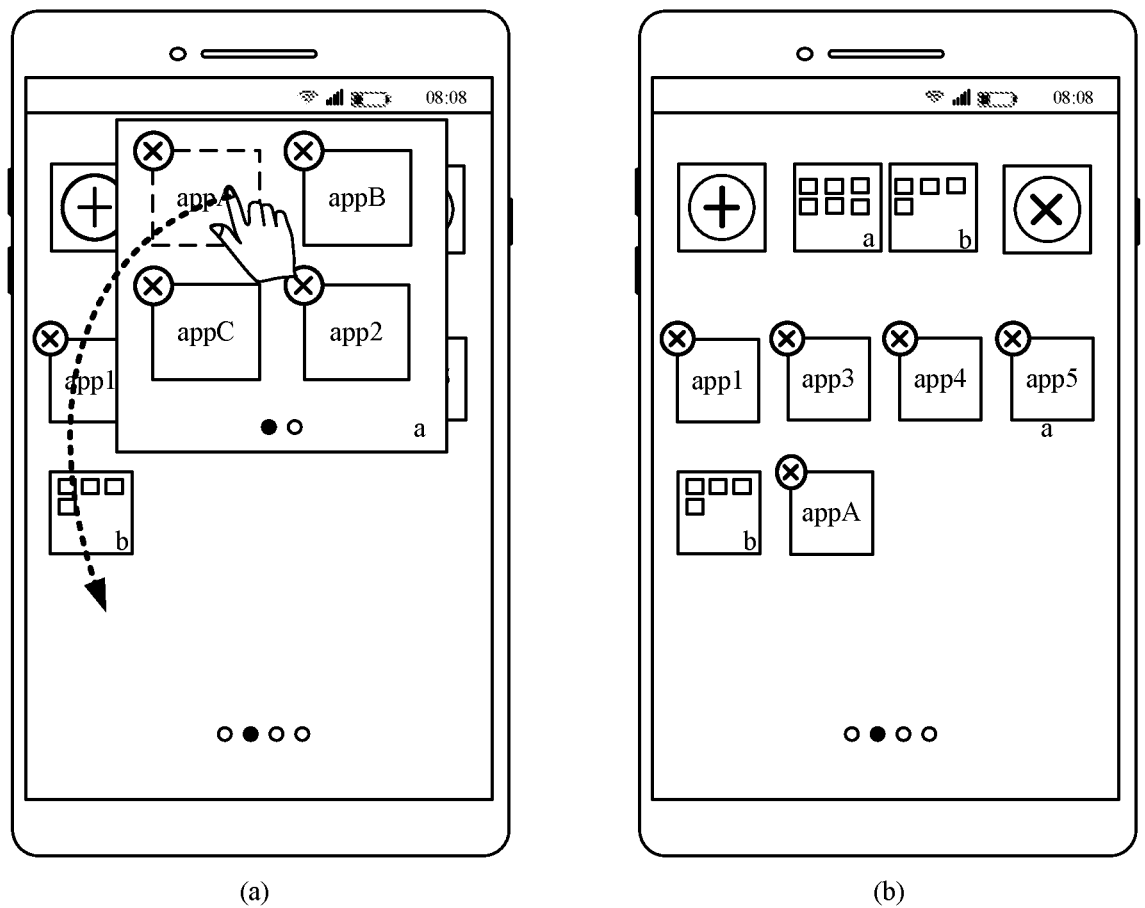
FIG. 7 is a third schematic diagram of an interface of an icon control method according to an embodiment of the present disclosure.

For example, as shown in (a) of FIG. 7, the first snapshot control is a snapshot control "a", the second application icon is "appA", the first application folder is an application folder "a", and the application folder "a" is not displayed on the first page. The third input is an input that the user drags "appA" from the snapshot control "a" to the first page. Through the third input, the terminal device moves "appA" from the application folder "a" to the first page, as shown in (b) of FIG. 7, and "appA" is displayed on the first page.

It should be noted that before step 205, the user needs to trigger the terminal device to expand and display the first snapshot control by performing an input on the first snapshot control. The first snapshot control expanded and displayed includes: all application icons in the first application folder corresponding to the first snapshot control.

In this way, the user may trigger the terminal device to move the second application icon from the first application folder to the first page by performing the third input on the second application icon in the first snapshot control. Especially, when the first application folder is not on the first page, a cross-page operation can be avoided and the efficiency of managing the application folder can be improved.

Figure 8:
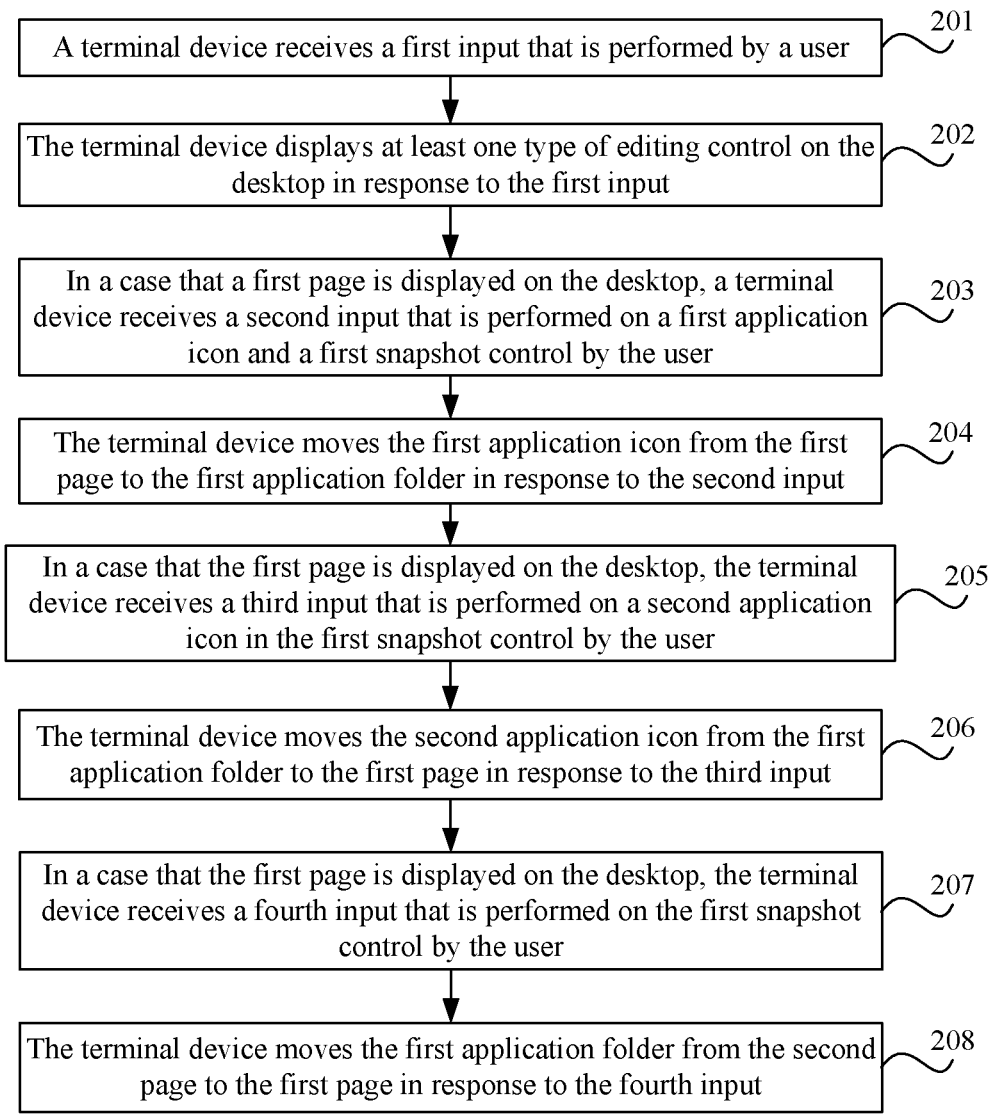
FIG. 8 is a fourth flowchart of an icon control method according to an embodiment of the present disclosure.

Optionally, the first application folder is displayed on a second page on the desktop, and the second page is different from the first page. With reference to FIG. 6, as shown in FIG. 8, after step 206, the icon control method provided in the embodiments of the present disclosure may further include the following steps 207 and 208.

Step 207: In a case that the first page is displayed on the desktop, the terminal device receives a fourth input performed by the user on the first snapshot control.

The fourth input may be an input that the user drags the first snapshot control to the first page; or may be an input that the user double-clicks the first snapshot control, or may be other feasible inputs. This is not limited in the embodiments of the present disclosure.

Step 208: The terminal device moves the first application folder from the second page to the first page in response to the fourth input.

Figure 9:
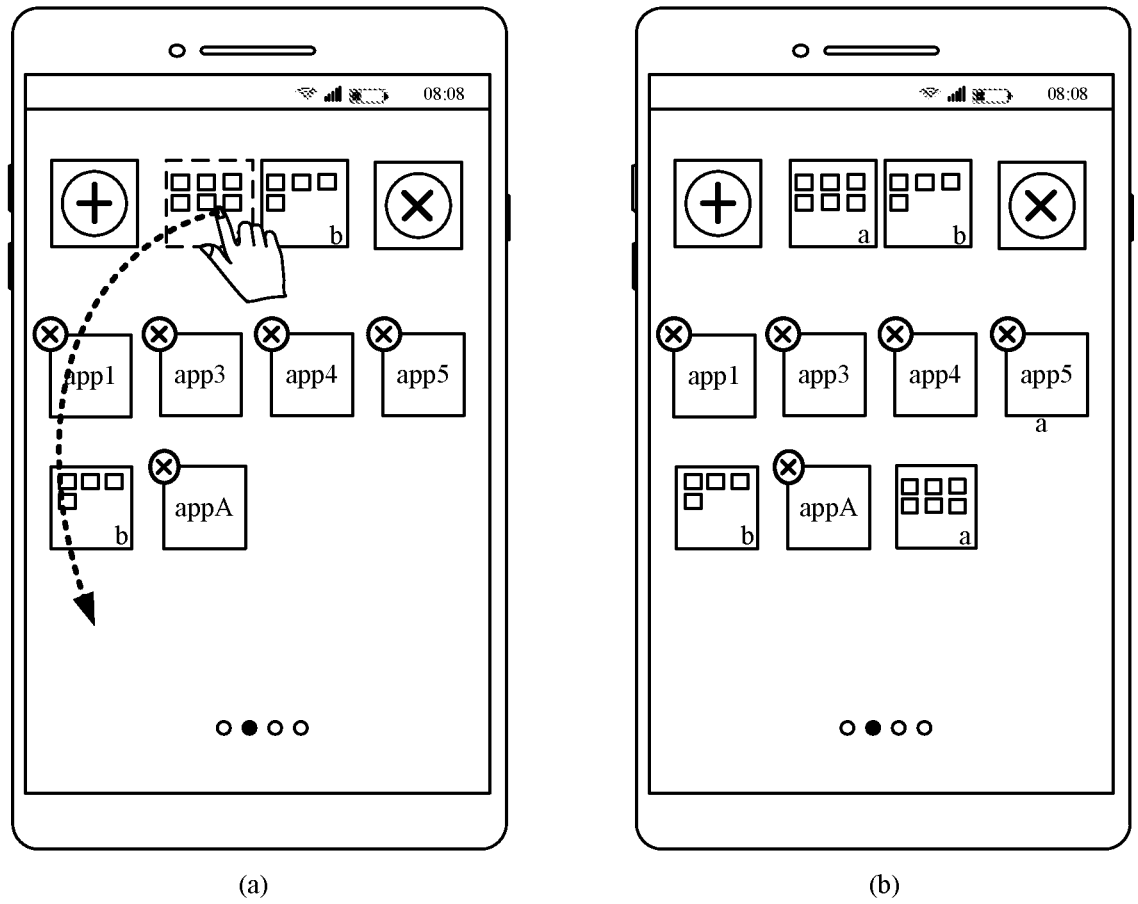
FIG. 9 is a fourth schematic diagram of an interface of an icon control method according to an embodiment of the present disclosure.

Based on the example described in FIG. 7, for another example, as shown in (a) of FIG. 9, the fourth input is an input that the user drags the snapshot control "a" to the first page. Through the third input, the terminal device moves the application folder "a" from the second page to the first page, as shown in (b) of FIG. 9, and the application folder "a" is displayed on the first page.

It should be noted that after the first application folder is moved through the above steps 207 and 208, the position of the first snapshot control may change (all snapshot controls are re-arranged) or may not change. This is not limited in the embodiments of the present disclosure.

Especially, when the first application folder is not on the first page, the user may trigger the terminal device to move the first application folder to the first page by performing the fourth input on the first snapshot control. A cross-page operation can be avoided and the efficiency of managing the application folder can be improved.

Figure 10:
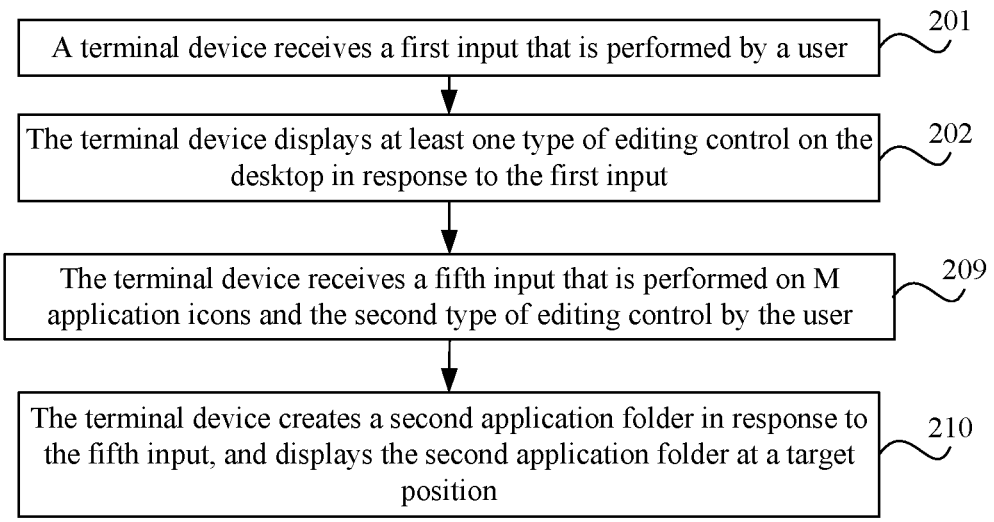
FIG. 10 is a fifth flowchart of an icon control method according to an embodiment of the present disclosure.

Optionally, the at least one type of editing control includes a second type of editing control, and the second type of editing control is used to create a new application folder. With reference to FIG. 2, as shown in FIG. 10, after step 202, the icon control method provided in the embodiments of the present disclosure may further include the following steps 209 and 210.

Step 209: The terminal device receives a fifth input performed by the user on M application icons and the second type of editing control.

M is a positive integer. Before the fifth input is received, the M application icons are separately displayed on at least one page of the N pages. That is, the M application icons may be application icons on one page, or application icons on different pages. This is not limited in the embodiments of the present disclosure.

The fifth input may be an input that the user sequentially drags the M application icons to the second snapshot control; or may be a third sub-input that the user selects the M application icons on the at least one page and a fourth sub-input that the user selects the second snapshot control (for example, the third sub-input and the fourth sub-input may be both click inputs), or may be other feasible inputs. This is not limited in the embodiments of the present disclosure.

Step 210: The terminal device creates a second application folder in response to the fifth input, and displays the second application folder at a target position.

The M application icons are included in the second application folder.

It should be noted that when M is 1, the M application icons are one application icon. In the icon editing state, the fifth input is performed on the application icon and the second type of editing control, so that the terminal device is triggered to display the second application folder at the target location. However, after exiting from the icon editing state, the second application folder is not displayed at the target location, and the application icon is still displayed at a location where the application icon is originally displayed on the desktop. Only when M is greater than or equal to 2, that is, the M application icons are at least two application icons, in the icon editing state, the fifth input is performed on the at least two application icons and the second type of editing control, so that the terminal device is triggered to display the second application folder at the target position. In addition, after exiting from the icon editing state, the second application folder is still displayed at the target position, and the at least two application icons are displayed in the second application folder. Besides, when entering the icon editing state again, the desktop may display the snapshot control corresponding to the second application folder.

The target position may be any position on any page on the desktop, and this is not limited in the embodiments of the present disclosure.

In this way, the input may be performed on the M application icons and the second type of editing control, to quickly create an application folder (create a new application folder). Especially, when the M application icons are not application icons on a same page, a cross-page operation can be avoided and the efficiency of managing the application folder can be improved. In addition, this can avoid the problem of confusion between a process of creating anew second application folder (moving one application icon to another application icon) and a process of moving a location of an application icon (using one application icon to replace another application icon) in related technologies.

Optionally, the fifth input includes M sub-inputs performed by the user on the M application icons, the target position is a position of a third application icon before the fifth input is received, and the third application icon is an application icon corresponding to a first sub-input of the M sub-inputs. That is, the second application folder is displayed at a location of the first operated application icon (before being moved) of the M application icons.

For example, the fifth input is M sub-inputs that the user sequentially moves the M application icons to the second type of editing control, and the second application folder is displayed at a location of the first application icon (a location before movement) moved into the second type of editing control.

Figure 11:
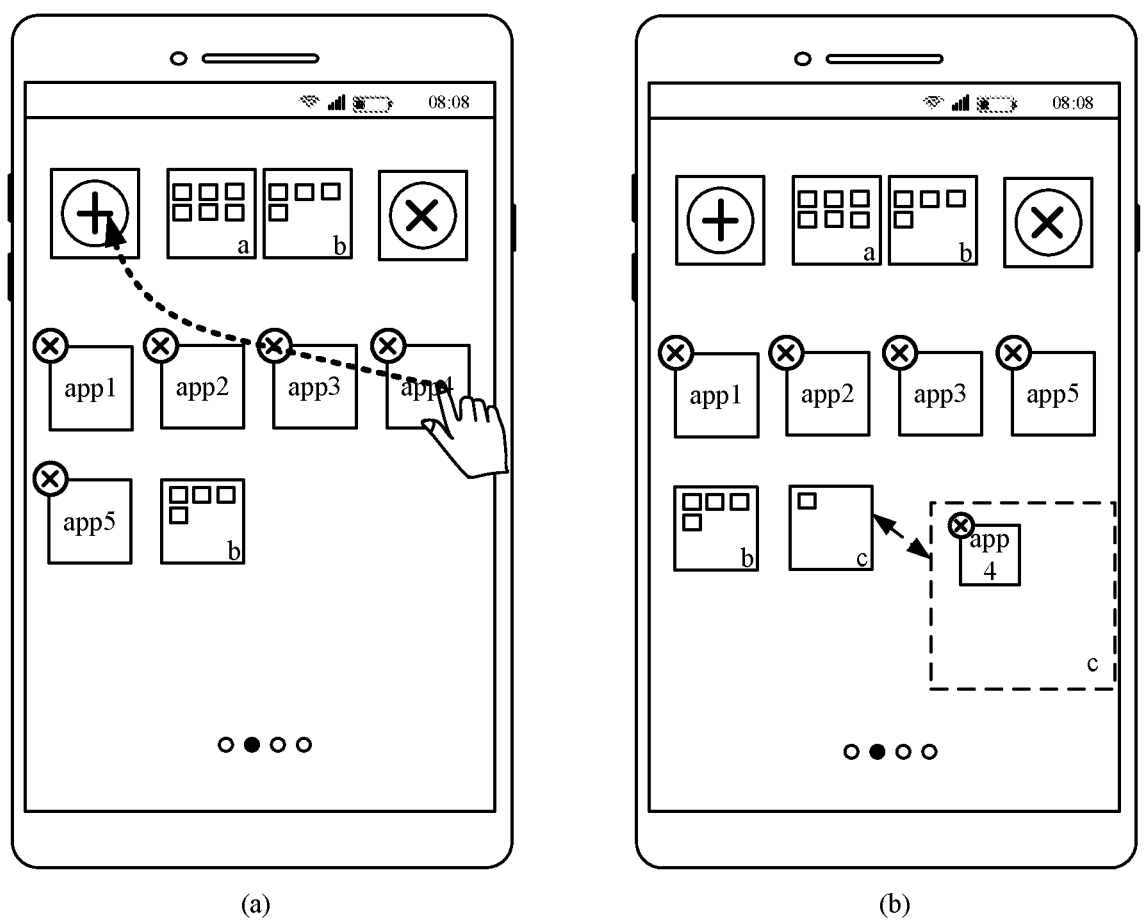
FIG. 11 is a fifth schematic diagram of an interface of an icon control method according to an embodiment of the present disclosure.

Based on the example in FIG. 3, for another example, as shown in (a) of FIG. 11, before the fifth input is received, the third application icon ("app4") is on the first page, and the second application folder is an application folder "c". The fifth input is an input that the user drags "app4" to the second type of editing control. Through the fifth input, as shown in (b) of FIG. 11, the terminal device displays the application folder "c" on the first page, and "app4" is displayed in the application folder "c" (the dotted-line application folder "c" is the enlarged solid-line application folder "c").

In this way, the second application folder is displayed at the location of the first application icon moved into the second type of editing control, and the user may control the first application icon moved into the second type of editing control, to control the location of the second application folder. Therefore, there is no need to move the location of the second application folder again, which can improve operation efficiency.

It should be noted that after moving application icons (for example, a fifth application icon) of the M application icons except the third application icon to the second type of editing control, an original position of the fifth application icon on the page may be occupied by another application icon, or may be empty. This is not limited in the embodiments of the present disclosure. When the M application icons belong to different pages, another application icon may be dragged to the second type of editing control after the page is updated (turning the page) through a user input. The terminal device may be triggered to expand and display the application folder by performing an input on the application folder (for example, clicking the application folder). The terminal device may also be triggered to edit a name of the application folder by performing an input on the application folder (for example, double-clicking the application folder).

Figure 12:
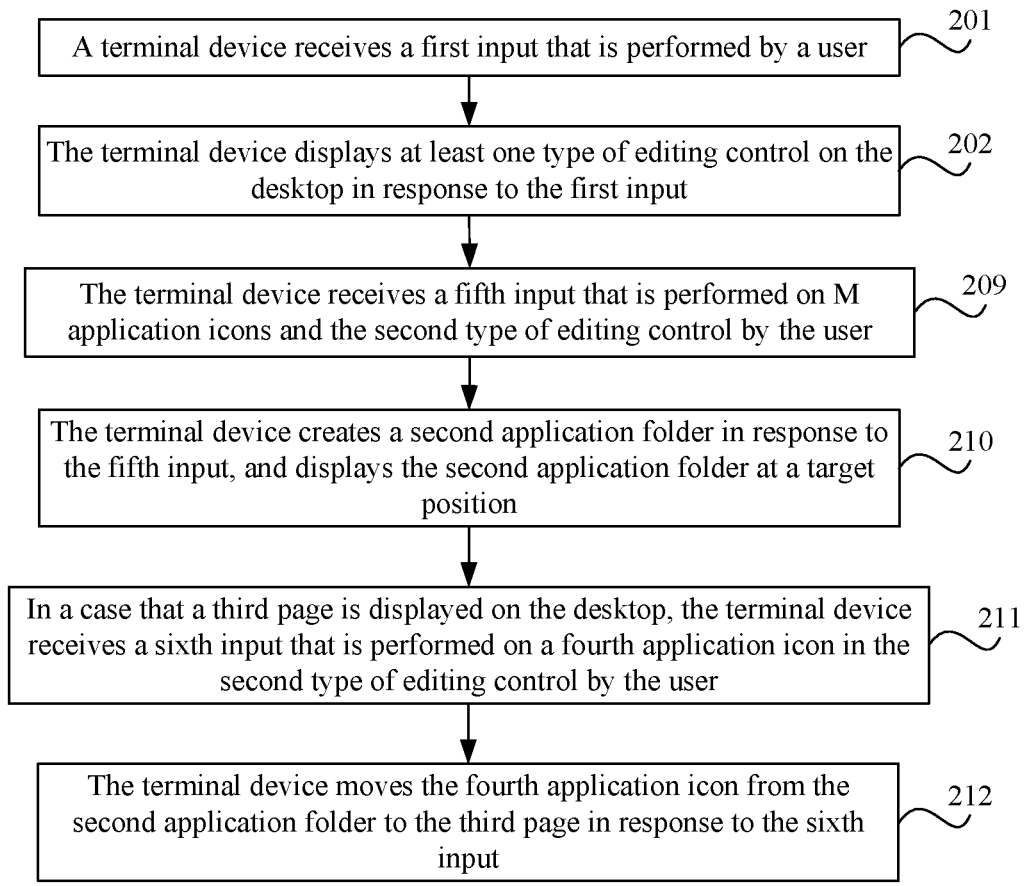
FIG. 12 is a sixth flowchart of an icon control method according to an embodiment of the present disclosure.

Optionally, the M application icons include a fourth application icon. With reference to FIG. 10, as shown in FIG. 12, after step 210, the icon control method provided in the embodiments of the present disclosure may further include the following steps 211 and 212.

Step 211: In a case that a third page is displayed on the desktop, the terminal device receives a sixth input that is performed on a fourth application icon in the second type of editing control by the user.

Optionally, the sixth input may be an input that the user moves the fourth application icon from the second type of editing control to the first page; or may be an input that the user double-clicks the fourth application icon in the second type of editing control, or may be other feasible inputs. This is not limited in the embodiments of the present disclosure.

Step 212: The terminal device moves the fourth application icon from the second application folder to the third page in response to the sixth input.

Before the fifth input is received, a page of the fourth application icon is different from the third page.

The user may move the application icon by operating the second type of editing control, which can improve the efficiency of managing the application folder.

It should be noted that with reference to the above steps 209 to 212, when the user needs to move an application icon from one page to another page (hereinafter referred to as a target page), the user may first move the application icon from a page of the application icon to the second type of editing control (trigger the terminal device to move the application icon from the page of the application icon to a temporary new application folder created), then trigger the terminal device to update the page by performing an input to turn the page, and then move the application icon from the created new application folder to the target page (trigger the terminal device to move the application icon from the created new application folder to the target page). In this way, the application icon may be moved across pages to avoid the operation of dragging the application icon across pages to improve the efficiency of managing the application folder.

Figure 13:
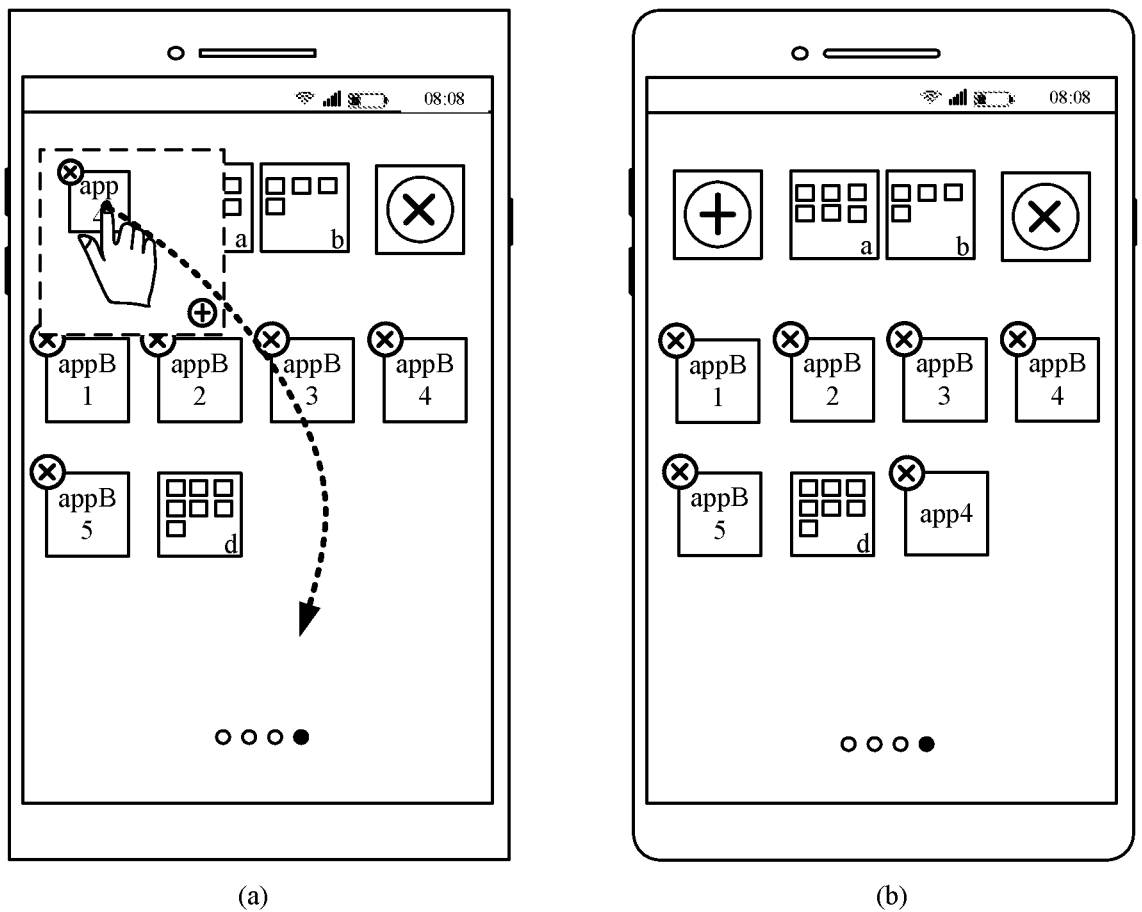
FIG. 13 is a sixth schematic diagram of an interface of an icon control method according to an embodiment of the present disclosure.

Based on the example described in FIG. 11, for another example, the fourth application icon is "app4", and the user first performs a slide input to trigger the terminal device to update the first page to a third page (the third page is different from the first page), and then clicks the second type of editing control to trigger the terminal device to expand the second type of editing control, as shown in (a) of FIG. 13. Through the sixth input, as shown in (b) of FIG. 13, the terminal device displays "app4" on the third page.

Figure 14:
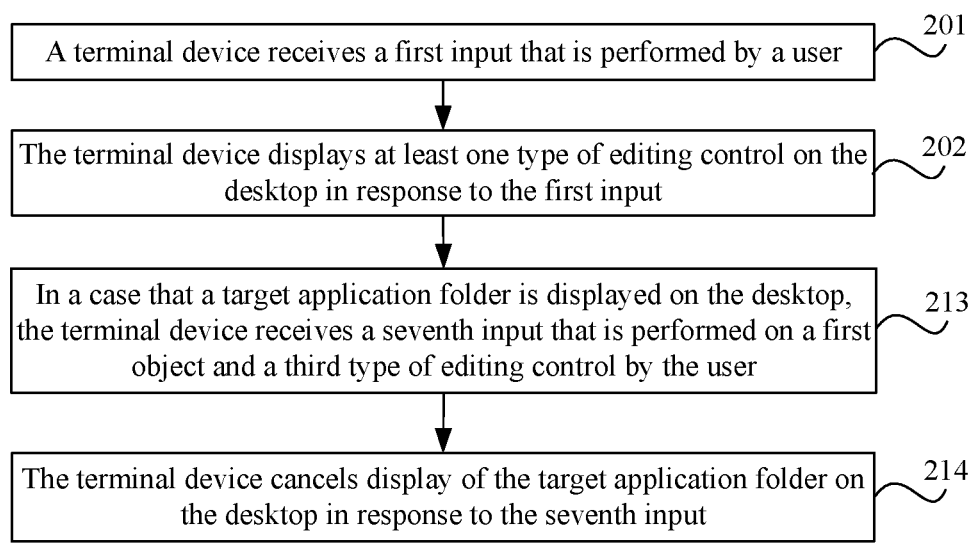
FIG. 14 is a seventh flowchart of an icon control method according to an embodiment of the present disclosure.

Optionally, the at least one type of editing control includes a third type of editing control, and the third type of editing control is used to delete an application folder. With reference to FIG. 2, as shown in FIG. 14, after step 202, the icon control method provided in the embodiments of the present disclosure may further include the following steps 213 and 214.

Step 213: In a case that a target application folder is displayed on the desktop, the terminal device receives a seventh input that is performed on a first object and a third type of editing control by the user.

The first object is a target snapshot control or the target application folder, and the target snapshot control is used to indicate the target application folder.

Optionally, the seventh input may be an input that the user drags the first object (the target snapshot control or the target application folder) to the third type of editing control; or may be an input that the user clicks the first object and clicks the third type of editing control, or may be other feasible inputs. This is not limited in the embodiments of the present disclosure.

Step 214: The terminal device cancels display of the target application folder on the desktop in response to the seventh input.

Optionally, the terminal device may only cancel display of the target application folder on the desktop in response to the seventh input, and keep displaying the target snapshot control. When the terminal device enters the icon editing state again after exiting the icon editing state, the target snapshot control is not displayed on the desktop.

Optionally, the terminal device may only cancel display of the target application folder and the target snapshot control on the desktop in response to the seventh input.

Compared with related technologies, application icons in the folder are removed one by one, and only when there is only one application icon remaining in the application folder, the application folder may be deleted. In the embodiments of the present disclosure, the application folder is quickly deleted by using the third type of editing control, which can improve the efficiency of managing the application folder.

Through the seventh input, the terminal device may be triggered to delete the target application folder. Optionally, while deleting the target application folder, all the application icons in the target application folder may be reserved and displayed on the desktop. Optionally, while deleting the target application folder, all the applications corresponding to the application icons in the target application folder may be uninstalled. This may be specifically determined according to an actual usage requirement, and is not limited in the embodiments of the present disclosure.

Figure 15:
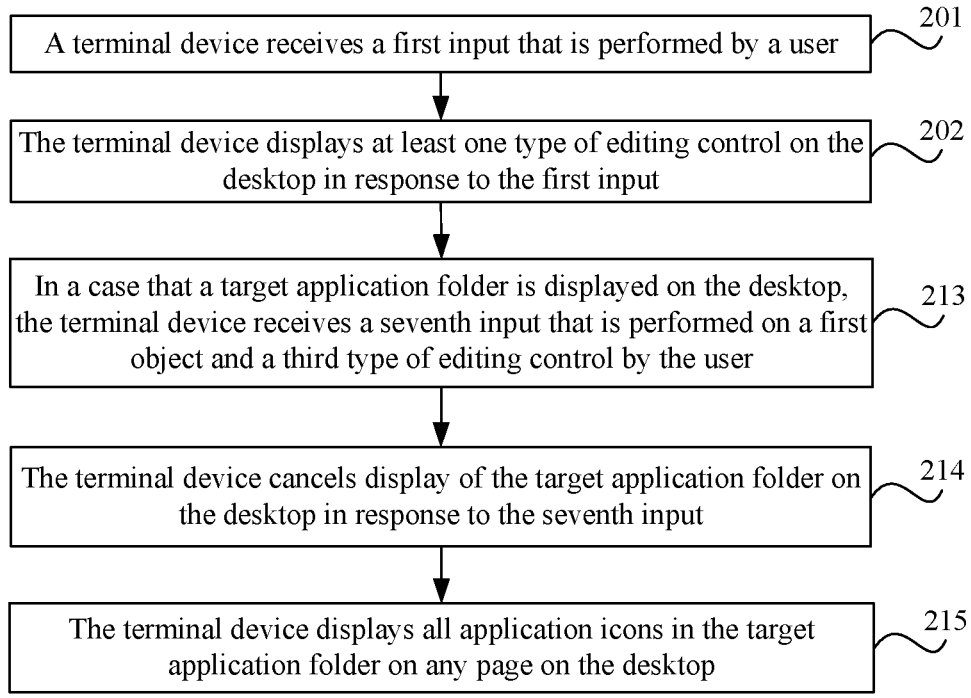
FIG. 15 is an eighth flowchart of an icon control method according to an embodiment of the present disclosure.
Figure 16:
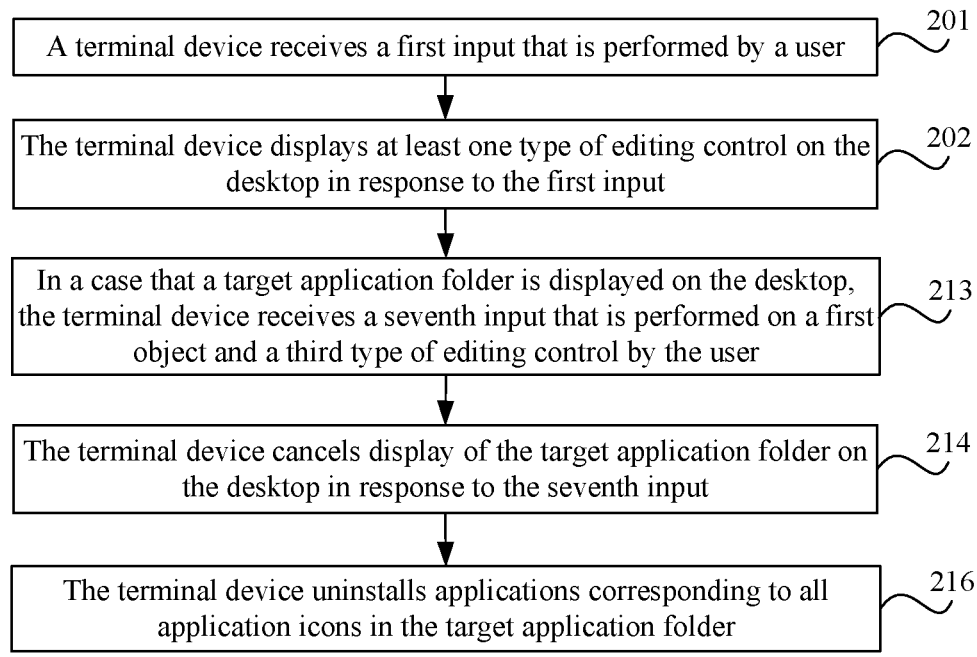
FIG. 16 is a ninth flowchart of an icon control method according to an embodiment of the present disclosure.

Optionally, with reference to FIG. 14, as shown in FIG. 15, after step 214, the icon control method provided in the embodiments of the present disclosure may further include the following step 215. Alternatively, with reference to FIG. 14, as shown in FIG. 16, after step 214, the icon control method provided in the embodiments of the present disclosure may further include the following step 216.

Step 215: The terminal device displays all application icons in the target application folder on any page on the desktop.

While deleting the target application folder, all the application icons in the target application folder may be reserved and displayed on the desktop. Specifically, all the application icons in the target application folder may be displayed on the original page of the target application folder. Alternatively, all the application icons in the target application folder may be displayed on the last page. Alternatively, all the application icons in the target application folder may be displayed on any other page. Alternatively, all the application icons in the target application folder may be displayed on different pages. This may be specifically determined according to actual usage requirements, and is not limited in the embodiments of the present disclosure.

Step 216: The terminal device uninstalls applications corresponding to all application icons in the target application folder.

The applications corresponding to all the application icons in the target application folder are uninstalled while the target application folder is deleted. Specifically, the applications corresponding to all the application icons in the target application folder may be uninstalled by default while the target application folder is deleted. Alternatively, a prompt message pops up before the target application folder is deleted, and the prompt information is used for determining whether to delete the target application folder and whether to uninstall the corresponding applications at the same time. Specifically, the prompt message may include an option of whether to uninstall the corresponding applications at the same time. If the user selects "uninstall the corresponding applications at the same time", when the target application folder is deleted, the applications corresponding to all the application icons in the target application folder are sequentially uninstalled. Otherwise, only the target application folder is deleted.

Figure 17:
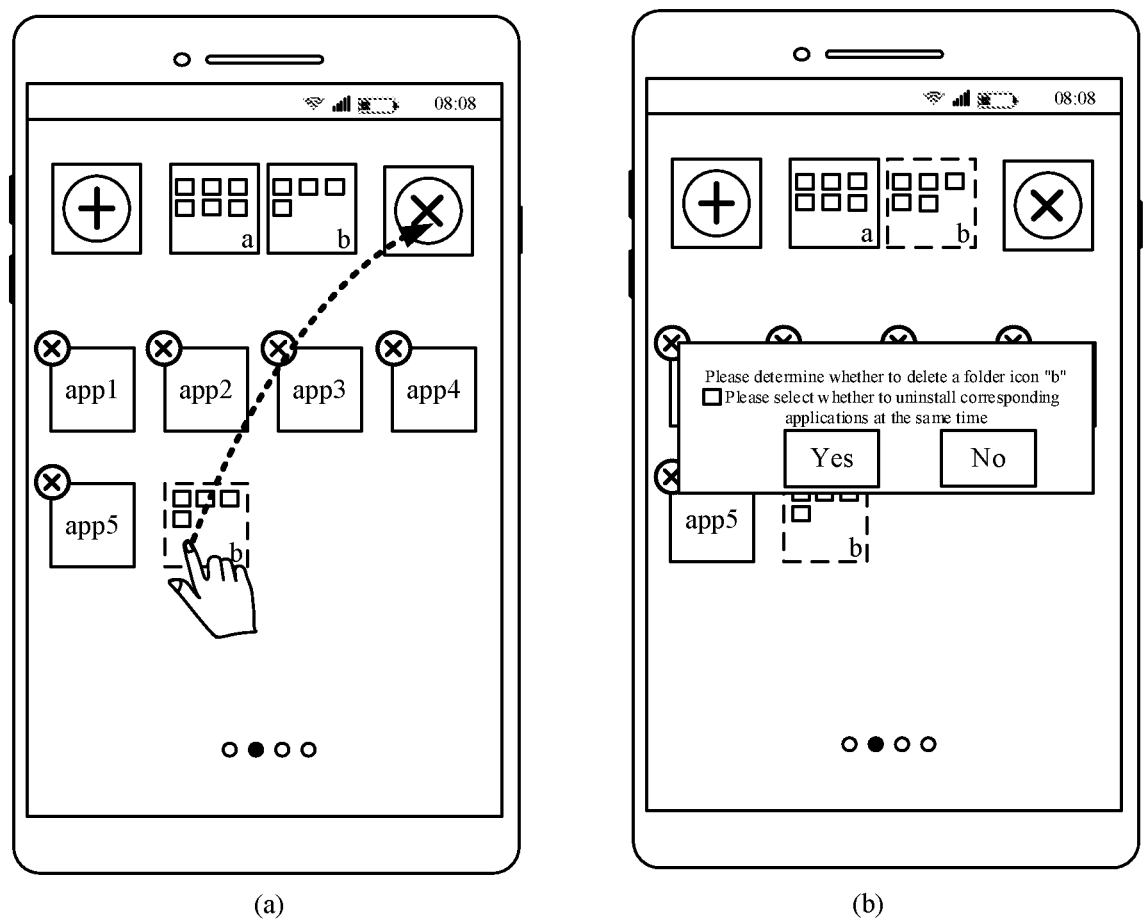
FIG. 17 is a seventh schematic diagram of an interface of an icon control method according to an embodiment of the present disclosure.

Based on the example shown in FIG. 2, for another example, the first object is the application folder "b" (or the snapshot control "b" corresponding to the application folder "b"), and prompt information as shown in (b) of FIG. 17 pops up by performing the seventh input shown in (a) of FIG. 17. If the user selects the option of "uninstall the corresponding applications at the same time", the applications corresponding to all the application icons in the application folder are uninstalled while the target application folder is deleted. Otherwise, only the target application folder is deleted.

In this way, while deleting the application folder by using the third type of editing control, it may be selected whether to uninstall the corresponding applications, which can further improve the efficiency of managing the application folder.

It should be noted that the embodiments of the present disclosure do not limit an execution order of step 203 and step 204, step 205 and step 206, step 207 and step 208, step 209 and step 210, step 211 and step 212, and step 213 and step 214. For example, an execution order between step 203 and step 204 and step 205 and step 206 is not limited, and may be specifically understood as: step 203 and step 204 can be performed first, and then step 205 and step 206 are performed; or step 205 and step 206 may be performed first, and then step 203 and step 204 may be performed.

Each of the accompanying drawings in the embodiments of the present disclosure is exemplified in conjunction with accompanying drawings of embodiments of independent claims. In a specific implementation, each of the accompanying drawings can also be implemented in combination with any other accompanying drawings. This is not limited in the embodiments of the present disclosure. For example, in the embodiments of the present disclosure, step 205 and step 206 in FIG. 6 are implemented with reference to FIG. 4. In specific implementation, step 205 and step 206 can also be implemented with reference to FIG. 2 (that is, with reference to FIG. 2, after step 202, the icon control method provided by the embodiments of the present disclosure may also include step 205 and step 206). In the embodiments of the present disclosure, step 209 and step 210 in FIG. 10 are implemented with reference to FIG. 2. In specific implementation, step 209 and step 210 may also be performed with reference to FIG. 4 (that is, with reference to FIG. 4, after step 204, the icon control method provided by the embodiments of the present disclosure may also include step 209 and Step 210), FIG. 6 (that is, with reference to FIG. 6, after step 206, the icon control method provided by the embodiments of the present disclosure can also include step 209 and step 210), or FIG. 8 (that is, with reference to FIG. 8, after step 208, the icon control method provided by the embodiments of the present disclosure can also include step 209 and step 210).

Optionally, the user may enable or disable the icon control function (a shortcut management function of an application icon and an application folder, which is specifically a function of displaying the at least one type of editing control and managing an application icon by using the at least one type of editing control) in system settings. That is, in the embodiments of the present disclosure, the icon control function described above may be used as an optional function, and the user may enable or disable this function in the system settings.

In the embodiments of the present disclosure, in the icon editing state, by displaying the at least one type of editing control on the screen, the at least one type of editing control may be used to quickly organize an application icon to an application folder, quickly move an application icon to a different page, quickly remove an application icon from an application folder, quickly move an application folder to another page, quickly delete an application folder, and quickly create an application folder. Therefore, this solves the problem of inconvenience and low efficiency of a cross-page movement operation, resolves the lack of related technologies in managing the application folder, and improves the efficiency of managing the application folder.

In an icon control method provided in the embodiments of the present disclosure, a terminal device may receive a first input that is performed by a user, where the first input is used to trigger a terminal device to enter an icon editing state, a target object is displayed on N pages on a desktop of the terminal device, the target object includes at least one of the following: an application icon and an application folder, one application folder includes at least two application icons, and one application icon is used to indicate one application; and display at least one type of editing control on the desktop in response to the first input, where each type of editing control of the at least one type of editing control is used to edit the target object on the N pages; where in a case that the terminal device is in the icon editing state, the at least one type of editing control is always displayed on the desktop, and N is a positive integer. In this solution, in the icon editing state, the terminal device can edit the target object on the N pages by maintaining display of each type of editing control of the at least one type of editing control on the desktop, so that the user does not need to drag an icon across pages to manage the icon. Therefore, this can improve the efficiency of managing the application folder, and can resolve the problem of low efficiency of managing the application folder in related technologies.

Figure 18:
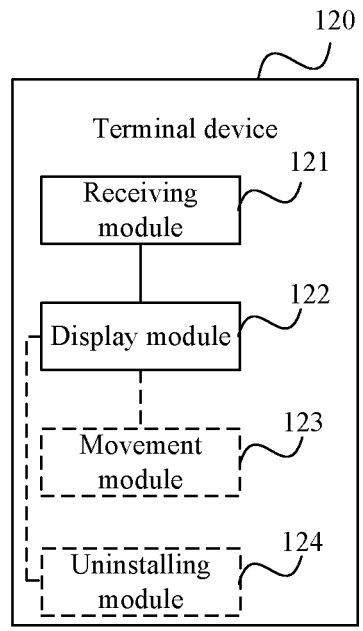
FIG. 18 is a schematic structural diagram of a terminal device according to an embodiment of the present disclosure.

As shown in FIG. 18, the embodiments of the present disclosure provide a terminal device 120. The terminal device 120 includes: a receiving module 121 and a display module 122. The receiving module 121 is configured to receive a first input that is performed by a user, where the first input is used to trigger a terminal device to enter an icon editing state, a target object is displayed on N pages on a desktop of the terminal device, the target object includes at least one of the following: an application icon and an application folder, one application folder includes at least two application icons, and one application icon is used to indicate one application. The display module 122 is configured to display at least one type of editing control on the desktop in response to the first input received by the receiving module 121, where each type of editing control of the at least one type of editing control is used to edit the target object on the N pages; and where in a case that the terminal device is in the icon editing state, the at least one type of editing control is always displayed on the desktop, and N is a positive integer.

Optionally, the at least one type of editing control includes a first type of editing control, the first type of editing control includes at least one snapshot control, and each snapshot control of the at least one snapshot control is used to indicate different application folders; and the terminal device 120 further includes: a movement module 123. The receiving module 121 is further configured to: after the at least one type of editing control is displayed on the desktop, in a case that a first page is displayed on the desktop, receive a second input performed by the user on a first application icon and a first snapshot control, where the first application icon is an application icon on the first page, the first snapshot control is used to indicate a first application folder, and the first snapshot control is a snapshot control of the at least one snapshot control; and the movement module 123 is configured to move the first application icon from the first page to the first application folder in response to the second input received by the receiving module 121.

Optionally, the receiving module 121 is further configured to: after the at least one type of editing control is displayed on the desktop, in a case that the first page is displayed on the desktop, receive a third input performed by the user on a second application icon in the first snapshot control; and the movement module 123 is further configured to move the second application icon from the first application folder to the first page in response to the third input received by the receiving module 121.

Optionally, the first application folder is displayed on a second page on the desktop, and the second page is different from the first page; and the receiving module 121 is further configured to: after the at least one type of editing control is displayed on the desktop, in a case that the first page is displayed on the desktop, receive a fourth input performed by the user on the first snapshot control; and the movement module 123 is further configured to move the first application folder from the second page to the first page in response to the fourth input received by the receiving module 121.

The at least one type of editing control includes a second type of editing control, and the second type of editing control is used to create a new application folder; and the receiving module 121 is further configured to: after the at least one type of editing control is displayed on the desktop, receive a fifth input performed by the user on M application icons and the second type of editing control, where before the fifth input is received, the M application icons are separately displayed on at least one page of the N pages; and the display module 122 is further configured to create a second application folder in response to the fifth input received by the receiving module 121, and display the second application folder at a target position, where the second application folder includes the M application icons, and M is a positive integer.

Optionally, the fifth input includes M sub-inputs performed by the user on the M application icons, the target position is a position of a third application icon before the fifth input is received, and the third application icon is an application icon corresponding to a first sub-input of the M sub-inputs.

Optionally, the M application icons include a fourth application icon. The receiving module 121 is further configured to: after the second application folder is displayed at the target position, in a case that a third page is displayed on the desktop, receive a sixth input that is performed on a fourth application icon in the second type of editing control by the user; and the movement module 123 is further configured to move the fourth application icon from the second application folder to the third page in response to the sixth input received by the receiving module 121; where before the fifth input is received, a page of the fourth application icon is different from the third page.

Optionally, the at least one type of editing control includes a third type of editing control, and the third type of editing control is used to delete an application folder. The receiving module 121 is further configured to: after the at least one type of editing control is displayed on the desktop, in a case that a target application folder is displayed on the desktop, receive a seventh input performed by the user on a target object and a third type of editing control, where the target object is a target snapshot control or the target application folder, and the target snapshot control is used to indicate the target application folder; and the display module 122 is further configured to cancel display of the target application folder on the desktop in response to the seventh input received by the receiving module 121.

Optionally, the display module 122 is further configured to: after canceling display of the target application folder on the desktop, display all application icons in the target application folder on any page on the desktop; or the terminal device 120 further includes: an uninstalling module 124; where the uninstalling module 124 is configured to: after display of the target application folder on the desktop is canceled, uninstall applications corresponding to all application icons in the target application folder.

The terminal device provided in this embodiment of the present disclosure can implement the processes in the foregoing method embodiments shown in FIG. 2 to FIG. 17. To avoid repetition, details are not described herein again.

The embodiments of the present disclosure provide a terminal device. The terminal device may receive a first input that is performed by a user, where the first input is used to trigger a terminal device to enter an icon editing state, a target object is displayed on N pages on a desktop of the terminal device, the target object includes at least one of the following: an application icon and an application folder, one application folder includes at least two application icons, and one application icon is used to indicate one application; and display at least one type of editing control on the desktop in response to the first input, where each type of editing control of the at least one type of editing control is used to edit the target object on the N pages; where in a case that the terminal device is in the icon editing state, the at least one type of editing control is always displayed on the desktop, and N is a positive integer. In this solution, in the icon editing state, the terminal device can edit the target object on the N pages by maintaining display of each type of editing control of the at least one type of editing control on the desktop, so that the user does not need to drag an icon across pages to manage the icon. Therefore, this can improve the efficiency of managing the application folder, and can resolve the problem of low efficiency of managing the application folder in related technologies.

Figure 19:
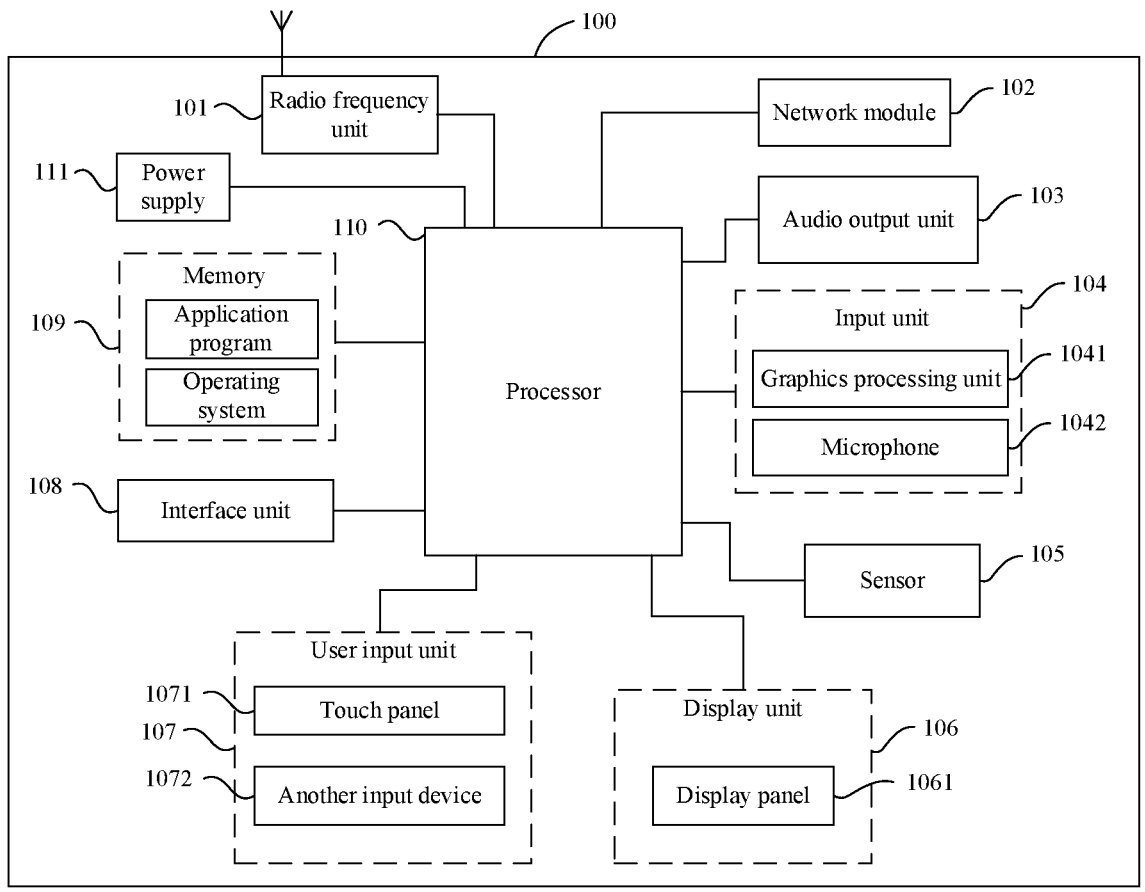
FIG. 19 is a schematic diagram of hardware of a terminal device according to an embodiment of the present disclosure.

FIG. 19 is a schematic diagram of a hardware structure of a terminal device according to embodiments of the present disclosure. As shown in FIG. 19, the terminal device 100 includes but is not limited to: a radio frequency unit 101, a network module 102, an audio output unit 103, an input unit 104, a sensor 105, a display unit 106, a user input unit 107, an interface unit 108, and a memory 109, a processor 110, a power supply 111, and the like. A person skilled in the art may understand that the structure of the terminal device shown in FIG. 19 does not constitute a limitation to the terminal device. The terminal device may include more or fewer components than that shown in the figure, or a combination of some components, or an arrangement of different components. In this embodiment of the present disclosure, the terminal device includes, but not limited to, a mobile phone, a tablet computer, a notebook computer, a palmtop computer, a vehicle-mounted terminal, a wearable device, a pedometer, or the like.

The user input unit 107 is configured to receive a first input that is performed by a user, where the first input is used to trigger a terminal device to enter an icon editing state, a target object is displayed on N pages on a desktop of the terminal device, the target object includes at least one of the following: an application icon and an application folder, one application folder includes at least two application icons, and one application icon is used to indicate one application; and the display unit 106 is configured to display at least one type of editing control on the desktop in response to the first input, where each type of editing control of the at least one type of editing control is used to edit the target object on the N pages; where in a case that the terminal device is in the icon editing state, the at least one type of editing control is always displayed on the desktop, and N is a positive integer.

The terminal device provided in the embodiments of the present disclosure may receive a first input that is performed by a user, where the first input is used to trigger a terminal device to enter an icon editing state, a target object is displayed on N pages on a desktop of the terminal device, the target object includes at least one of the following: an application icon and an application folder, one application folder includes at least two application icons, and one application icon is used to indicate one application; and display at least one type of editing control on the desktop in response to the first input, where each type of editing control of the at least one type of editing control is used to edit the target object on the N pages; where in a case that the terminal device is in the icon editing state, the at least one type of editing control is always displayed on the desktop, and N is a positive integer. In this solution, in the icon editing state, the terminal device can edit the target object on the N pages by maintaining display of each type of editing control of the at least one type of editing control on the desktop, so that the user does not need to drag an icon across pages to manage the icon. Therefore, this can improve the efficiency of managing the application folder, and can resolve the problem of low efficiency of managing the application folder in related technologies.

It should be understood that in the embodiments of the present disclosure, the radio frequency unit 101 can be configured to receive and send information or receive and send signal during calls. Specifically, the radio frequency unit 101 receives downlink data from a base station, and transmits the downlink data to the processor 110 for processing. In addition, the radio frequency unit 101 sends uplink data to the base station. Generally, the radio frequency unit 101 includes, but not limited to, an antenna, at least one amplifier, a transceiver, a coupler, a low noise amplifier, and a duplexer, and the like. In addition, the radio frequency unit 101 may further communicate with other devices through a wireless communications system and network.

The terminal device provides a user with wireless broadband Internet access through the network module 102, for example, helps the user send and receive emails, browse web pages, and access streaming media.

The audio output unit 103 can convert audio data received by the radio frequency unit 101 or the network module 102 or stored in the memory 109 into an audio signal, and output the audio signal as sound. Moreover, the audio output unit 103 may further provide audio output (for example, call signal receiving sound and message receiving sound) related to a specific function performed by the terminal device 100. The audio output unit 103 includes a speaker, a buzzer, a telephone receiver, and the like.

The input unit 104 is configured to receive audio or video signals. The input unit 104 may include a graphics processing unit (GPU) 1041 and a microphone 1042. The GPU 1041 processes image data of a static picture or a video obtained by an image capturing apparatus (for example, a camera) in video capturing mode or image capturing mode. A processed image frame can be displayed on the display unit 106. The image frame processed by the graphics processing unit 1041 can be stored in the memory 109 (or another storage medium) or sent via the radio frequency unit 101 or the network module 102. The microphone 1042 may receive sound and can process the sound into audio data. The processed audio data may be converted, in a call mode, into a format that may be sent to a mobile communication base station by using the radio frequency unit 101 for output.

The terminal device 100 further includes at least one sensor 105, for example, an optical sensor, a motion sensor, and other sensors. Specifically, the optical sensor includes an ambient light sensor and a proximity sensor. The ambient light sensor may adjust luminance of the display panel 1061 based on brightness of ambient light. The proximity sensor may turn off the display panel 1061 and/or backlight when the terminal device 100 approaches an ear. As a type of the motion sensor, an accelerometer sensor may detect an acceleration in each direction (generally, three axes), and detect a value and a direction of gravity when the accelerometer sensor is static, and may be configured to recognize a terminal device posture (such as screen switching between landscape and portrait modes, a related game, or magnetometer posture calibration), a function related to vibration recognition (such as a pedometer or a knock), and the like. The sensor 105 may further include a fingerprint sensor, a pressure sensor, an iris sensor, a molecular sensor, a gyroscope, a barometer, a hygrometer, a thermometer, and an infrared sensor. Details are not described herein.

The display unit 106 is configured to display information inputted by a user or information provided to a user. The display unit 106 may include the display panel 1061, and the display panel 1061 may be configured in a form of a liquid crystal display (LCD), an organic light-emitting diode (OLED), or the like.

The user input unit 107 may be configured to receive input numeral or character information, and generate key signal input related to user setting and function control of the terminal device. Specifically, the user input unit 107 includes a touch panel 1071 and another input device 1072. The touch panel 1071, also called a touch screen, may collect a touch operation of the user on or near the touch panel 1071 (for example, an operation performed by the user with any suitable object or accessory such as a finger or a stylus on or near the touch panel 1071). The touch panel 1071 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, sends the touch point coordinates to the processor 110, and receives and executes a command sent by the processor 110. In addition, the touch panel 1071 may be implemented by using a plurality of types such as a resistive type, a capacitive type, an infrared ray, and a surface acoustic wave. In addition to the touch panel 1071, the user input unit 107 may further include another input device 1072. Specifically, the another input device 1072 may include, but not limited to, a physical keyboard, a function key (for example, a volume control key or a switch key), a trajectory ball, a mouse, and a joystick. Details are not described herein again.

Further, the touch panel 1071 can cover the display panel 1061. When detecting a touch operation on or near the touch panel 1071, the touch panel 1071 transmits the touch operation to the processor 110 to determine a type of a touch event. Then, the processor 110 provides corresponding visual output on the display panel 1061 based on the type of the touch event. Although in FIG. 19, the touch panel 1071 and the display panel 1061 are configured as two independent components to implement input and output functions of the terminal device, in some embodiments, the touch panel 1071 and the display panel 1061 can be integrated to implement the input and output functions of the terminal device. Details are not limited herein.

The interface unit 108 is an interface for connecting an external apparatus to the terminal device 100. For example, the external apparatus may include a wired or wireless headset jack, an external power supply (or a battery charger) port, a wired or wireless data port, a storage card port, a port for connecting an apparatus having an identification module, an audio input/output (I/O) port, a video I/O port, a headset jack, or the like. The interface unit 108 may be configured to receive an input (for example, data information or power) from an external apparatus and transmit the received input to one or more elements in the terminal device 100, or transmit data between the terminal device 100 and the external apparatus.

The memory 109 may be configured to store a software program and various data. The memory 109 may mainly include a program storage area and a data storage area. The program storage area may store an operating system, an application program required by at least one function (such as a sound play function or an image play function), and the like. The data storage area may store data (such as audio data or an address book) created based on use of the mobile phone, and the like. In addition, the memory 109 may include a high-speed random access memory, or may include a nonvolatile memory, for example, at least one disk storage device, a flash memory, or another volatile solid-state storage device.

The processor 110 is a control center of the terminal device, connects various parts of the entire terminal device by using various interfaces and circuits, and performs various functions of the terminal device and processes data by running or executing the software programs and/or the modules stored in the memory 109 and invoking data stored in the memory 109, so as to monitor the terminal device as a whole. The processor 110 may include one or more processing units. Optionally, the processor 110 may be integrated with an application processor and a modem processor. The application processor mainly processes an operating system, a user interface, an application program, and the like, and the modem processor mainly processes wireless communication. It can be understood that the above-mentioned modem processor may not be integrated in the processor 110.

The terminal device 100 may further include the power supply 111 (such as a battery) that supplies power to each component. Optionally, the power supply 111 may be logically connected to the processor 110 by using a power management system, to implement functions such as charging, discharging, and power consumption management by using the power management system.

In addition, the terminal device 100 includes some functional modules that are not shown. Details are not described herein.

Optionally, an embodiment of the present disclosure further provides a terminal device, including the processor 110 and the memory 109 that are shown in FIG. 19, and a computer program stored in the memory 109 and executable on the processor 110, where the computer program, when executed by the processor 110, implements the processes of the icon control method in the foregoing method embodiments shown in any one of FIG. 2 to FIG. 17, and the same technical effects can be achieved. To avoid repetition, details are not described herein again.

An embodiment of the present disclosure further provides a computer-readable storage medium. The computer-readable storage medium stores a computer program, and the computer program, when executed by a processor, implements the processes of the icon control method in the foregoing method embodiments shown in any one of FIG. 2 to FIG. 17, and a same technical effect can be achieved. To avoid repetition, details are not described herein again. The computer readable storage medium may be a read-only memory (ROM), a random access memory (RAM), a magnetic disk, a compact disc, or the like.

It should be noted that in this specification, the terms "comprise", "include" and any other variants thereof are intended to cover non-exclusive inclusion, so that a process, a method, an article, or an device that includes a series of elements not only includes these very elements, but may also include other elements not expressly listed, or also include elements inherent to this process, method, article, or apparatus. An element limited by "includes a . . . " does not, without more constraints, preclude the presence of additional identical elements in the process, method, article, or apparatus that includes the element.

Based on the descriptions of the foregoing implementations, a person skilled in the art may clearly understand that the method in the foregoing embodiment may be implemented by software in addition to a necessary universal hardware platform or by hardware only. In most circumstances, the former is an exemplary implementation. Based on such an understanding, the technical solutions of the present disclosure essentially, or the part contributing to the related technologies may be implemented in a form of a software product. The computer software product is stored in a storage medium (for example, a ROM/RAM, a magnetic disk, or a compact disc), and includes a plurality of instructions for instructing a terminal device (which may be a mobile phone, a computer, a server, an air conditioner, a network device, or the like) to perform the method described in the embodiments of this disclosure.

The embodiments of this disclosure are described above with reference to the accompanying drawings, but this disclosure is not limited to the foregoing implementations. The foregoing implementations are only illustrative rather than restrictive. Inspired by this disclosure, a person of ordinary skill in the art can still derive many variations without departing from the essence of this disclosure and the protection scope of the claims. All these variations shall fall within the protection of this disclosure.

What is claimed is:

1. An icon control method, comprising:
receiving a first input that is performed by a user, wherein the first input is used to trigger a terminal device to enter an icon editing state, and a target object is displayed on N pages on a desktop of the terminal device, wherein the target object comprises at least one of the following:
an application icon used to indicate an application or an application folder having at least two application icons; and
displaying at least one type of editing control on the desktop in response to the first input, wherein each type of editing control of the at least one type of editing control is used to edit the target object on the N pages; wherein:
in a case that the terminal device is in the icon editing state, the at least one type of editing control is always displayed on the desktop;
N is a positive integer;
the N pages comprise a first page and a second page being different from each other, the second page comprising a first application folder; and
in a case that the first page is displayed on the desktop, receiving a fourth input performed by the user on a first snapshot control, and moving the first application folder from the second page to the first page in response to the fourth input.

2. The icon control method according to claim 1, wherein the at least one type of editing control comprises a first type of editing control, wherein the first type of editing control comprises at least one snapshot control, and each snapshot control of the at least one snapshot control is used to indicate different application folders; and
wherein after the displaying at least one type of editing control on the desktop, the icon control method further comprises:
in a case that the first page is displayed on the desktop, receiving a second input performed by the user on a first application icon and the first snapshot control, wherein the first application icon is an application icon on the first page, the first snapshot control is used to indicate a first application folder, and the first snapshot control is a snapshot control of the at least one snapshot control; and
moving the first application icon from the first page to the first application folder in response to the second input.

3. The icon control method according to claim 2, after the displaying at least one type of editing control on the desktop, further comprising:
in the case that the first page is displayed on the desktop, receiving a third input performed by the user on a second application icon in the first snapshot control; and
moving the second application icon from the first application folder to the first page in response to the third input.

4. The icon control method according to claim 1, wherein the at least one type of editing control comprises a second type of editing control, and the second type of editing control is used to create a new application folder; and
wherein after the displaying at least one type of editing control on the desktop, the icon control method further comprises:
receiving a fifth input performed by the user on M application icons and the second type of editing control, wherein before the fifth input is received, the M application icons are separately displayed on at least one page of the N pages; and
creating a second application folder in response to the fifth input and displaying the second application folder at a target position, wherein the second application folder comprises the M application icons, and M is a positive integer.

5. The icon control method according to claim 4, wherein the fifth input comprises M sub-inputs performed by the user on the M application icons, and the target position is a position of a third application icon before the fifth input is received, wherein the third application icon is an application icon corresponding to a first sub-input of the M sub-inputs.

6. The icon control method according to claim 4, wherein the M application icons comprise a fourth application icon; and
wherein after the displaying the second application folder at the target position, the icon control method further comprises:
in a case that a third page is displayed on the desktop, receiving a sixth input that is performed on a fourth application icon in the second type of editing control by the user; and
moving the fourth application icon from the second application folder to the third page in response to the sixth input,
wherein before the fifth input is received, a page of the fourth application icon is different from the third page.

7. The icon control method according to claim 1, wherein the at least one type of editing control comprises a third type of editing control, and the third type of editing control is used to delete an application folder; and
wherein after the displaying at least one type of editing control on the desktop, the icon control method further comprises:
in a case that a target application folder is displayed on the desktop, receiving a seventh input that is performed on a first object and the third type of editing control by the user, wherein the first object is a target snapshot control or the target application folder, and the target snapshot control is used to indicate the target application folder; and
canceling display of the target application folder on the desktop in response to the seventh input.

8. The icon control method according to claim 7, after the canceling display of the target application folder on the desktop, further comprising:
displaying all application icons in the target application folder on any page on the desktop; or
uninstalling applications corresponding to all application icons in the target application folder.

9. A terminal device, comprising a processor, a memory, and a computer program that is stored in the memory and executable by the processor, wherein the computer program, when executed by the processor, causes the processor to perform:
receiving a first input that is performed by a user, wherein the first input is used to trigger the terminal device to enter an icon editing state, and a target object is displayed on N pages on a desktop of the terminal device, wherein the target object comprises at least one of the following:
an application icon used to indicate an application or an application folder having at least two application icons; and
displaying at least one type of editing control on the desktop in response to the first input, wherein each type of editing control of the at least one type of editing control is used to edit the target object on the N pages; wherein:
in a case that the terminal device is in the icon editing state, the at least one type of editing control is always displayed on the desktop;
N is a positive integer;
the N pages comprise a first page and a second page being different from each other, the second page comprising a first application folder;
and the computer program, when executed by the processor, further causes the processor to perform:
in a case that the first page is displayed on the desktop, receiving a fourth input performed by the user on a first snapshot control, and moving the first application folder from the second page to the first page in response to the fourth input.

10. The terminal device according to claim 9, wherein the at least one type of editing control comprises a first type of editing control, wherein the first type of editing control comprises at least one snapshot control, and each snapshot control of the at least one snapshot control is used to indicate different application folders; and
wherein the computer program, when executed by the processor, further causes the processor to perform:
after the at least one type of editing control is displayed on the desktop, in a case that the first page is displayed on the desktop, receiving a second input performed by the user on a first application icon and the first snapshot control, wherein the first application icon is an application icon on the first page, the first snapshot control is used to indicate a first application folder, and the first snapshot control is a snapshot control of the at least one snapshot control; and
moving the first application icon from the first page to the first application folder in response to the second input.

11. The terminal device according to claim 10, wherein the computer program, when executed by the processor, further causes the processor to perform:
after the at least one type of editing control is displayed on the desktop, in the case that the first page is displayed on the desktop, receiving a third input performed by the user on a second application icon in the first snapshot control; and
moving the second application icon from the first application folder to the first page in response to the third input.

12. The terminal device according to claim 9, wherein the at least one type of editing control comprises a second type of editing control, and the second type of editing control is used to create a new application folder; and
wherein the computer program, when executed by the processor, further causes the processor to perform:
after the at least one type of editing control is displayed on the desktop, receiving a fifth input performed by the user on M application icons and the second type of editing control, wherein before the fifth input is received, the M application icons are separately displayed on at least one page of the N pages; and
creating a second application folder in response to the fifth input and displaying the second application folder at a target position, wherein the second application folder comprises the M application icons, and M is a positive integer.

13. The terminal device according to claim 12, wherein the fifth input comprises M sub-inputs performed by the user on the M application icons, and the target position is a position of a third application icon before the fifth input is received, wherein the third application icon is an application icon corresponding to a first sub-input of the M sub-inputs.

14. The terminal device according to claim 12, wherein the M application icons comprise a fourth application icon; and
wherein the computer program, when executed by the processor, further causes the processor to perform:
after the second application folder is displayed at the target position, in a case that a third page is displayed on the desktop, receiving a sixth input that is performed on a fourth application icon in the second type of editing control by the user; and
moving the fourth application icon from the second application folder to the third page in response to the sixth input,
wherein before the fifth input is received, a page of the fourth application icon is different from the third page.

15. The terminal device according to claim 9, wherein the at least one type of editing control comprises a third type of editing control, and the third type of editing control is used to delete an application folder; and
wherein the computer program, when executed by the processor, further causes the processor to perform:
after the at least one type of editing control is displayed on the desktop, in a case that a target application folder is displayed on the desktop, receiving a seventh input that is performed on a first object and the third type of editing control by the user, wherein the first object is a target snapshot control or the target application folder, and the target snapshot control is used to indicate the target application folder; and
canceling display of the target application folder on the desktop in response to the seventh input.

16. The terminal device according to claim 15, wherein the computer program, when executed by the processor, further causes the processor to perform:
after canceling display of the target application folder on the desktop, displaying all application icons in the target application folder on any page on the desktop; or
after display of the target application folder on the desktop is canceled, uninstalling applications corresponding to all application icons in the target application folder.

17. A non-transitory computer-readable storage medium, wherein the non-transitory computer-readable storage medium stores a computer program, and the computer program, when executed by a processor, implements an icon control method, the icon control method comprising:
receiving a first input that is performed by a user, wherein the first input is used to trigger a terminal device to enter an icon editing state, and a target object is displayed on N pages on a desktop of the terminal device, wherein the target object comprises at least one of the following:
an application icon used to indicate an application or an application folder having at least two application icons; and displaying at least one type of editing control on the desktop in response to the first input, wherein each type of editing control of the at least one type of editing control is used to edit the target object on the N pages; wherein:
- in a case that the terminal device is in the icon editing state, the at least one type of editing control is always displayed on the desktop;
- N is a positive integer;
- the N pages comprise a first page and a second page being different from each other, the second page comprising a first application folder; and the computer program, when executed by the processor, further causes the processor to perform:
- in a case that the first page is displayed on the desktop, receiving a fourth input performed by the user on a first snapshot control, and moving the first application folder from the second page to the first page in response to the fourth input.

18. The non-transitory computer readable storage medium according to claim 17, wherein the at least one type of editing control comprises a first type of editing control, wherein the first type of editing control comprises at least one snapshot control, and each snapshot control of the at least one snapshot control is used to indicate different application folders; and wherein after the displaying at least one type of editing control on the desktop, the icon control method further comprises:

in a case that the first page is displayed on the desktop, receiving a second input performed by the user on a first application icon and the first snapshot control, wherein the first application icon is an application icon on the first page, the first snapshot control is used to indicate a first application folder, and the first snapshot control is a snapshot control of the at least one snapshot control; and moving the first application icon from the first page to the first application folder in response to the second input.

* * * * *